United States Patent
Petschek et al.

(10) Patent No.: US 6,671,019 B1
(45) Date of Patent: Dec. 30, 2003

(54) ELECTRODE PATTERNS FOR LIQUID CRYSTAL CELLS

(75) Inventors: Rolfe G. Petschek, Shaker Heights, OH (US); Donald B. Taber, Newbury Park, CA (US)

(73) Assignees: Case Western Reserve University, Cleveland, OH (US); Rockwell Science Center L.L.C., Thousand Oaks, CA (US)

( * ) Notice: Subject to any disclaimer, the term of this patent is extended or adjusted under 35 U.S.C. 154(b) by 0 days.

(21) Appl. No.: 09/439,039

(22) Filed: Nov. 12, 1999

(51) Int. Cl.⁷ .............................................. G02F 1/1337
(52) U.S. Cl. ........................................ 349/129; 349/141
(58) Field of Search ................................. 349/141, 143, 349/129, 33

(56) References Cited

U.S. PATENT DOCUMENTS

| | | |
|---|---|---|
| 3,843,231 A | 10/1974 | Borel et al. |
| 5,309,264 A | 5/1994 | Lien et al. |
| 5,466,358 A | 11/1995 | Kiyomiya et al. |
| 5,477,358 A | 12/1995 | Rosenblatt et al. |
| 5,598,285 A | 1/1997 | Kondo et al. |
| 5,602,662 A | 2/1997 | Rosenblatt et al. |
| 5,646,705 A | 7/1997 | Higuchi et al. |
| 5,745,207 A | 4/1998 | Asada et al. |
| 5,754,266 A | 5/1998 | Ohta et al. |
| 5,757,455 A | 5/1998 | Sugiyama et al. |
| 5,777,711 A | 7/1998 | Sugiyama |

FOREIGN PATENT DOCUMENTS

JP   57-63378   4/1982

*Primary Examiner*—Toan Ton
(74) *Attorney, Agent, or Firm*—Watts Hoffmann Co., LP

(57) ABSTRACT

A liquid crystal cell in which the electrodes are patterned with small scale non-conducting gaps so as to efficiently control the number, size and location of liquid crystal domains within which the liquid crystal exhibits an azimuthal orientation with predominantly the same sign and direction in a field-on condition. By patterning one or both of the electrodes with small scale non-conducting gaps, having widths less than about 2.5 times the cell gap t, that are disposed predominantly within the liquid crystal domains, or a combination of such gaps with gaps disposed primarily along the domain boundaries, one not only can obtain excellent control of the nature of the liquid crystal domains, but also the responsiveness of the cell.

43 Claims, 10 Drawing Sheets

ELECTRODE PATTERNS FOR LIQUID CRYSTAL CELLS

BACKGROUND OF THE INVENTION

Nematic, smectic C, chiral nematic, chiral Smectic C and other liquid crystal devices are routinely used in display and other electro-optic applications. For many display applications luminance, grey scale and grey scale as a function of angle are important characteristics. Promising devices which potentially exhibit favorable luminance, grey scale and grey scale as a function of angle properties include vertically or homeotropically aligned cholesteric (VAC) devices, such as described in U.S. Pat. No. 5,466,358, and in-plane switching cells such as described in U.S. Pat. No. 5,477,358. For good switching rates and grey scale behavior as a function of viewing angle these devices require rapid, multi-domain control of the liquid crystal director.

The use of in-plane electric fields for the multi-domain control of the alignment of a liquid crystal has been described, for example, in U.S. Pat. No. 5,309,264. Refinements have been described in, for example, U.S. Pat. No. 5,777,711. None of these devices exhibits adequate and sufficiently rapid domain control when the liquid crystal is homeotropically aligned. Some of these patterns also require relatively precise positioning of the top and bottom electrodes relative to each other, which is difficult to accomplish and typically results in an appreciable loss of manufacturing throughput. Another approach involving in-plane electric fields involves two electrodes on at least one of the surfaces of a liquid crystal device as seen in U.S. Pat. No. 5,745,207. This results in large in-plane electric fields, but presents practical difficulties and requires numerous steps in connection with the manufacture of such devices.

SUMMARY OF THE INVENTION

This invention makes possible exceptionally good control over the alignment of liquid crystals in displays or other electro-optic devices. Control of the alignment of the liquid crystal is achieved by use of appropriately patterned electrodes. In particular, small scale patterns are created in the electrodes by non-conducting gaps having dimensions and shapes selected in accordance with the invention. These small scale patterns are contained largely or entirely within a single domain of the liquid crystal, often covering much of the area of the electrode. As a result, the instant invention allows for good control of the liquid crystal directors, which results in fast switching and good control over the number, size and location of liquid crystal domains. Moreover, the advantages of the invention can generally be achieved by relatively simple and inexpensive manufacturing techniques.

Accordingly, in one aspect of the invention there is provided a liquid crystal cell comprising first and second substrates spaced apart by a distance t and a liquid crystal material disposed therebetween. The first and second electrodes are disposed on said first and second substrates, respectively, and connected to a power supply. At least one of the first and second electrodes has at least one pixel defined by dimensions in a plane parallel to the plane of the substrate and further including at least one non-conducting gap therein, the non-conducting gap being a small scale gap having at least one dimension in the plane of the electrode that does not exceed about 2.5 times the distance t. When in a field-on condition in cooperation with the other of said first or second electrode, the pixel contains an electric field effective to produce at least one liquid crystal domain having dimensions in a plane parallel to the plane of the substrates within which the liquid crystal molecules have an azimuthal orientation with predominantly the same sign and direction, and wherein at least a portion of the small scale gap is disposed within the domain at least about 1 times, and preferably at least 2.0 times, the distance t from the boundaries of the domain. Preferably, the cell includes a plurality of said small scale gaps within said at least one pixel.

In one embodiment, when in said field-on condition, the liquid crystal material exhibits a plurality of domains within the pixel, each said domain being adjacent at least one said small scale gap, or in another embodiment, each said domain is adjacent a plurality of said small scale gaps. In yet another aspect of the invention, both said first and second electrodes include at least one pixel containing at least one said small scale gap or, in another embodiment, a plurality of said small scale gaps. In another embodiment where both the first and second electrodes include at least one pixel, in a field-on condition, the liquid crystal material exhibits a plurality of domains within each pixel, each domain being adjacent at least one small scale gap or a plurality of said small scale gaps. In many embodiments of the invention, the pixels on the first and second substrates are substantially adjacent and coextensive.

In still other embodiments, at least a portion of a boundary of the domain is substantially linear, and the boundary is substantially adjacent and colinear with at least one of a non-conducting gap or portion of a non-conducting gap, or a difference in a location of edges of the electrodes on opposing substrates at an edge of the pixel, and a plurality of said small scale gaps is disposed at an angle thereto, or extend at an angle therefrom. In many embodiments, the small scale gaps are substantially rectangular and parallel to one another. In other embodiments, all the domain boundaries are substantially linear and disposed substantially adjacent and colinear with a non-conducting gap or a portion of a non-conducting gap, or with a difference in a location of edges of the electrodes on opposing substrates at an edge of the pixel, with a plurality of said small scale gaps disposed at an angle thereto or extending at an angle therefrom. Preferably, the small scale gaps are substantially rectangular and parallel. In some preferred embodiments, both said first and second substrates include at least one such pixel such that the pixels are substantially adjacent and coextensive. In other embodiments, when each pixel includes a plurality of said small scale gaps, the small scale gaps are substantially rectangular and parallel to one another, and the substantially parallel gaps on opposing said substrates are rotated relative to each other by an angle of from about 10° more to about 30° less than an angle by which the azimuthal orientation of said liquid crystal rotates as a consequence of its natural pitch on passing through the cell. Preferably, the liquid crystal material is selected from a nematic liquid crystal or a chiral nematic liquid crystal having negative dielectric anisotropy, and at least one said substrate is treated to align the liquid crystal.

It is another aspect of the invention wherein at least about 60% of the area within at least one pixel is within about 1.5 times the distance t, and preferably 0.7 times the distance t from an edge of a conducting portion of the electrode. In many preferred embodiments at least about 80%, and more preferably still 90%, of the area of the pixels will be so designed. In one such embodiment, when in a field-on condition, the liquid crystal material exhibits a plurality of domains within the pixel, each domain being adjacent a plurality of said small scale gaps wherein at least about 60% of the area within said at least one pixel is within about 1.5 times the distance t from an edge of a conducting portion of said electrode.

Preferably, the small scale gaps form a pattern within each liquid crystal domain which transforms according to a two-dimensional space group selected from the group consisting of Pg, Cm or Pl.

It is yet another aspect of the invention to provide a liquid crystal cell wherein the pixel includes a plurality of small scale non-conducting gaps having a length and a width in the plane of said electrode wherein said width does not exceed about 2.5 times the distance t and wherein at least about 60% of the area within said at least one pixel is within about 1.5 times the distance t from an edge of a conducting portion of said electrode such that, when in a field-on condition in cooperation with the other of said first or second electrode, the pixel contains an electric field effective to control the of the liquid crystal directors of adjacent liquid crystals within said pixel. Preferably, at least about 90% of said area within said pixel is within about 1.5 times the distance t from an edge of a conducting portion of said electrode. In a preferred embodiment, the gaps have a length greater than said width and are generally parallel. Still more preferably, the gaps are substantially rectangular and parallel to one another. In other embodiments, at least about 60%, preferably at least about 80%, and still more preferably at least about 90% of the area within said at least one pixel is within about 0.7 times the distance t from an edge of a conducting portion of said electrode. In some embodiments, the pixel will include at least one non-conducting gap or portion of a non-conducting gap substantially adjacent and colinear with at least a portion of a boundary of said domain, and a plurality of said small scale gaps disposed at an angle thereto or extend at an angle therefrom. In some embodiments, said small. scale gaps being substantially rectangular and parallel to one another. In many embodiments of the invention, both said first and second substrates include at least one pixel such that the pixels are substantially adjacent and coextensive. In some embodiments, the substantially parallel gaps on opposing substrates are rotated relative to each other by an angle from about 10° more to about 30° less than an angle by which the azimuthal orientation of said liquid crystal rotates as a consequence of its natural pitch on passing through the cell.

It is yet another aspect of the invention, in the liquid crystal cell comprising first and second substrates spaced apart by a distance t; a liquid crystal material disposed therebetween; first and second electrodes disposed on said first and second substrates, respectively; at least one of the first and second electrodes including at least one pixel defined by dimensions in a plane parallel to the plane of said substrate, and further including a plurality of non-conducting gaps therein, to provide the non-conducting gaps so as to have dimensions in the plane of the electrode and be arranged such that the gaps form a pattern within the pixel whereby, when in a field-on condition in cooperation with the other of said first or second electrode, said electrodes give rise to a plurality of spatial harmonics of an electrical potential within a liquid crystal domain. The harmonics include at least one triplet of harmonics. The spatial harmonics further have a period less than the largest dimension of said liquid crystal domain. At least one triplet of the plurality of spatial harmonics have wavevectors that, when added together, equal zero and further: i) one of said triplet of harmonics by itself, and the remaining two harmonics acting together, result in spatial variations in the magnitude of a vector D, the direction of a vector D or both, such that these variations have the same sign when D has one sign, and have a different sign when D has another sign; or, ii) complex amplitudes of at least one of the triplets of harmonics, evaluated at one of the substrates, when multiplied together have a large imaginary part; or, iii) complex amplitudes of at least one of the triplets of harmonics evaluated at one of the substrates has a range of magnitudes of said wavevectors, and said magnitudes, when multiplied together and also multiplied by the sum over permutations of the wavevectors of one wavevector times the dot product of the other two wavevectors and summed or integrated over this range of wavevectors results in a sum or integral with a large imaginary part, whereby the electrodes form one or more liquid crystal domains having dimensions in a plane parallel to the plane of said substrates within which said liquid crystal molecules have an azimuthal orientation with predominantly the same sign and direction.

In one aspect of the invention, each said substrate includes at least one such pixel. Preferably, said pixels are substantially adjacent and coextensive. In another aspect of the invention, one substrate includes a plurality of such pixels. It is another aspect still for both substrates to include a plurality of such pixels and, preferably, each such pixel is substantially adjacent and coextensive with a corresponding pixel on the opposing substrate. In some embodiments, at least 60% of a pixel's area is within about 1.5 times the distance t from an edge of a conducting portion of an electrode. In other embodiments, each substrate includes at least one pixel having at least 80% of its area within about 0.7 times the distance t from an edge of a conducting portion of the electrode. Preferably, the pattern of small scale gaps within each liquid crystal domain transforms according to a two-dimensional space group selected from the group consisting of Pg, Cm or Pl. In another aspect of the invention, within at least one liquid crystal domain, said pattern of small scale gaps on one substrate can be obtained from the pattern on the other substrate by rotating the pattern by 180° around an axis passing through the center of the cell perpendicular to the substrate normal. In some embodiments, said rotation axis makes an angle to a direction perpendicular to a longitudinal direction of the gaps between about 5° less than to about 15° more than half the angle an azimuthal orientation of the liquid crystal will rotate on passing through the cell. Preferably, the substrate including said at least one pixel is further treated to promote alignment of said liquid crystal. In some embodiments, both said substrates are treated to promote alignment of said liquid crystal. In still further embodiments, the liquid crystal material is selected from a nematic liquid crystal or a chiral nematic liquid crystal having negative dielectric anisotropy and one or both substrates is treated to promote homeotropic alignment of the liquid crystal.

It is still another aspect of the invention to provide a method. More particularly, in a liquid crystal cell comprising first and second substrates spaced apart by a distance t and a liquid crystal material disposed therebetween, and first and second electrodes disposed on the first and second substrates, respectively, and connected to a power supply, the invention provides a method of controlling the sign and direction of an azimuthal orientation of said liquid crystal. The method comprises disposing non-conducting gaps in at least one of the electrodes having dimensions in the plane of the electrode and being arranged such that the gaps form a pattern in the electrode effective to, in a field-on condition in cooperation with the other electrode, give rise to a plurality of spatial harmonics of an electrical potential within a liquid crystal domain, which harmonics include at least one triplet of harmonics, said spatial harmonics having a period less than the largest dimension of said liquid crystal domain, at least one triplet of said plurality of spatial harmonics having wavevectors that, when added together, equal zero and further wherein i) one of said triplet of harmonics by itself, and the remaining two harmonics acting together, result in spatial variations in the magnitude of a vector D, the direction of a vector D or both, such that these variations have the same sign when D has one sign, and have a different sign when D has the another sign; or, ii) complex amplitudes of at least one of said triplets of harmonics, evaluated at one of said substrates, when multiplied together have a large imaginary part; or, iii) complex amplitudes of at least one of said triplets of harmonics evaluated at one of said substrates has a range of magnitudes of said wavevectors, and said magnitudes, when multiplied together and also multiplied by the sum over permutations of said wavevectors of one wavevector times the dot product of the other two wavevectors and summed or integrated over this range of wavevectors results in a sum or integral with a large imaginary part.

In one embodiment, the method comprises disposing the non-conducting gaps so as to produce a plurality of said domains. In another embodiment, the method comprises disposing the non-conducting gaps so as to produce at least one pixel having dimensions in a plane parallel to the plane of said substrates within which at least about 60%, preferably at least about 80%, and more preferably still at least about 90%, of the area of the pixel is within about 1.5 times the distance t, and preferably within about 0.7 times the distance t from an edge of a conducting portion of said electrode. In some aspects of the invention, the non-conducting gaps are disposed wherein at least a portion of a boundary of a domain is substantially linear, and the boundary is substantially adjacent and colinear with at least one of a non-conducting gap or portion of a non-conducting gap, or a difference in a location of edges of the electrodes on opposing substrates at an edge of said pixel, and further comprising a plurality of small scale gaps disposed at an angle thereto. Preferably, the method comprises disposing the non-conducting gaps in a pattern which transforms according to a two-dimensional space group selected from the group consisting of Pg, Cm or Pl. In one aspect of the invention, the method comprises providing at least a portion of the non-conducting gaps so as to create small scale gaps having at least one dimension in the plane of the electrode that does not exceed about 2.5 times the distance t, and such that at least a portion of the small scale gaps is disposed within said domain at least about 1 times the distance t from the boundaries of said domain. Preferably, the gaps are disposed so as to produce a plurality of liquid crystal domains.

It will be apparent to one of ordinary skill in the art that the foregoing principles can be useful in numerous liquid crystal display or other electro-optic applications. The electrode patterns described herein can be used in conjunction with a number of cells wherein the liquid crystal director has more than two possible orientations in a field-on condition. These include, but are not limited to, the homeotropically aligned liquid crystal cell, described in detail hereinafter, a twisted nematic cell with planar alignment wherein the alignment twists an angle of 90° on passing through the cell, a hybrid cell with negative dielectric anisotropy wherein the orientation of the liquid crystal director near the homeotropically aligned surface is controlled by the patterned electrode of this invention. Such electrodes may also be useful for cells filled with smectic C, chiral smectic C or other tilted chiral or achiral smectics, such as smectic $C_\gamma$ wherein the tilt of the director in subsequent layers is more complex than that realized in a smectic C. The patterned electrodes of the invention may particularly be useful in cells in which the layer normal of the smectic liquid crystal material is parallel to the normal of the electrodes or substrates. They may also be useful in dynamically determining the orientation of a nematic or other director as it relaxes from one state to another.

One preferred application of the present invention is control of the alignment of the director in any liquid crystal cell that has homeotropic alignment. An example of such a liquid crystal cell is one in which both sides of the cell have been treated to promote homeotropic alignment and which employs an achiral nematic liquid crystal. Another is a so-called "hybrid" cell, as noted above, in which one electrode has been rubbed, either uniformly or patterned, or otherwise treated to promote planar alignment, and the other electrode is treated to promote homeotropic alignment, and patterned in accordance with the present invention. When such a device employs an active matrix, the invention advantageously obviates the need to rub the substrate containing the active matrix. Appropriate patterning of the unrubbed substrate in accordance with the invention will result in an advantageous increase in the number of domains in the liquid crystal cell.

In a particularly preferred application the present invention is used to control the director in a nematic or cholesteric liquid crystal cell, such as that described in U.S. Pat. No. 5,477,358, incorporated herein by reference. This cell consists of a chiral nematic liquid crystal homeotropically aligned between two electrodes so that the director of the liquid crystal is parallel to the z-axis, i.e., the direction normal to the surface of the electrode. The liquid crystal has negative dielectric anisotropy so that when a sufficiently large voltage is applied the liquid crystal director in the cell will tilt. With appropriate compensators this allows for a very dark "black" state, and other desirable viewing behavior. Application of this invention to such a device will control the direction of the tilt in the xy-plane, enabling the relatively simple production of high performance, multidomain devices with large viewing angles and grey scale.

Still further, the present invention can produce multidomain patterns in a nematic twist cell. Such a cell consists of two surfaces rubbed in such a way as to provide alignment in the plane of the surface. The surface rubbing is patterned such that the director rotates approximately 90° moving from one surface to the other, in either a clockwise or counterclockwise direction. In such cells, the addition of chiral dopants or surface treatments to provide a pre-tilt in the liquid crystal have been used to impart a preference between these two possible directions of rotation. Except for a patterned pre-tilt, which requires complicated manufacturing steps, these techniques do not allow for the rotation to be in one direction in some parts of the cell and in the opposite direction in other parts of the cell. By contrast, the patterned electrodes of the present invention allow for control of the direction of twist throughout the cell without additional process steps.

Finally, it is also possible to use the present invention on an electrode that has been treated for planar or nearly planar alignment. If the anchoring strength is small, then the present invention will allow reorientation of the nematic director when the electric field is applied to obtain the same results as an in-plane switching electrode without the significantly more complicated manufacturing requirements associated therewith.

These and other advantages and a fuller understanding of the invention will be had from the following detailed description of the preferred embodiments and accompanying drawings.

DETAILED DESCRIPTION OF THE PREFERRED EMBODIMENTS

Figure 1:
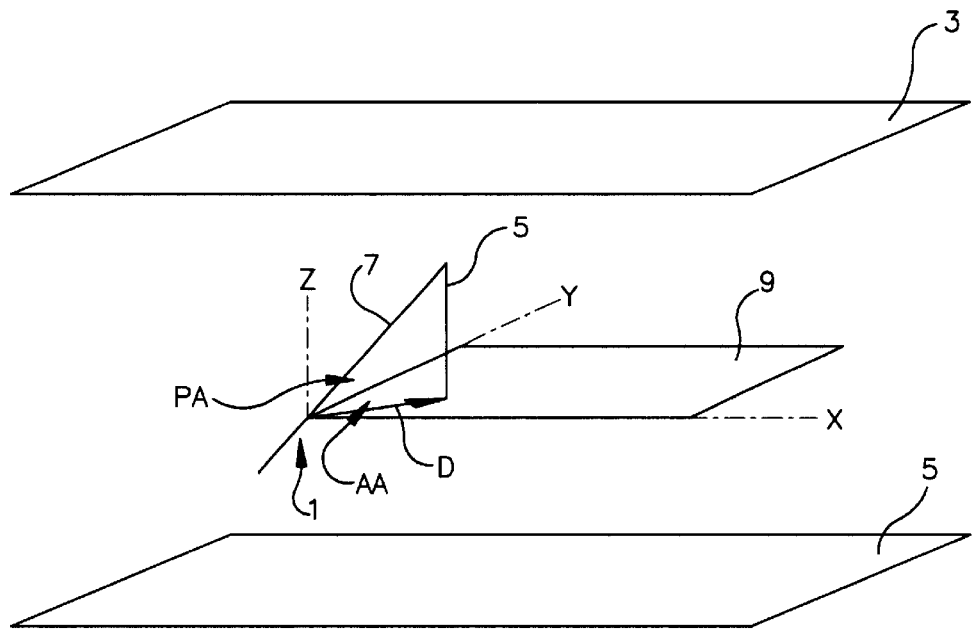
FIG. 1 is a stylized representation of an orientation of a liquid crystal director between two electrodes.

Although, for simplicity, the advantages of the inventive small scale patterning of electrodes is illustrated primarily in connection with homeotropically aligned nematic liquid crystals having negative dielectric anisotropy, its application to other liquid crystal materials, such as smectic C and chiral or achiral nematics with positive dielectric anisotropy, will be apparent to those of ordinary skill in the art in view of this disclosure.

In general, this invention concerns liquid crystal cells which consist of a layer of liquid crystal with approximately uniform thickness sandwiched between two substrates that have conducting regions to which an electrical potential can be applied. As is known in the art, the substrate will, generally, be further divided into pixels or other optical apertures such that the potential difference between the substrates can be selectively controlled in different pixels. It is advantageous in some devices to apply, when desired, a plurality of different potentials to each pixel. Power supplies and drive electronics, including active matrices, passive matrices and the like, suitable for use in conjunction with the present invention will be apparent to those of ordinary skill in the art. The substrates are typically treated to promote appropriate alignment of the liquid crystal. The typical area of the optically active region of a device may be on the order of 0.01 to 100 centimeters, and is typically much larger than the layer thickness or cell gap t, which is typically on the order of 1 to 40 $\mu$m and which is maintained by, for example, glass spacers and the like, all as will be apparent to those of ordinary skill in the art.

In many devices the pixels have linear size in all directions in the plane of the substrate many times larger than the cell gap t. A typical device might have pixels 300 $\mu$m by 100 $\mu$m and a cell gap of 5 $\mu$m, although some applications could employ pixels on the order of 1 mm by 5 mm with such a cell gap. Moreover, single pixel devices, such as light shutters or very large displays may have a pixel that is several centimeters on a side. In the preferred application of the present invention, the pixel dimensions in the plane of the substrate will be significantly larger, e.g., at least about five times larger, than the cell gap t. As will be apparent in view of the instant disclosure, the invention also concerns gaps in single electrodes disposed on opposing substrates. When an electrical potential difference is applied across a cell with a thickness smaller than the other dimensions, the average electrical field in the cell in the plane of the electrodes is expected to be very small. Insofar as there is an in-plane average, it is reasonably interpreted as coming from the boundaries of the pixel. Hence, the average electric field will point from one substrate to the other. The varying potentials inside the pixel and the resulting spatially varying fields not resulting from the boundaries of the pixel will, hereinafter, be discussed primarily as periodic (harmonic) functions.

FIG. 1 illustrates the effect of electrodes in a chiral or achiral homeotropically aligned liquid crystal cell such as described in U.S. Pat. No. 5,477,358, incorporated herein by reference. FIG. 1 is a stylized representation showing liquid crystal 1 between two electrodes 3 and 5 treated to promote homeotropic alignment of the liquid crystal as discussed in the noted patent. The nematic director, i.e., the approximate average orientation of the long axis of the liquid crystal molecules 1, is shown subsequent to the application of an electric field sufficient to induce a Fredrick's transition. The vector D is shown as the projection of the liquid crystal director at the center of the cell onto a plane 9 parallel to the planes of the electrodes 3 and 5. As the electric field in such a cell is increased the director will distort from a normally generally homeotropic orientation to the tilted orientation shown in FIG. 1. As seen, in a completely isotropic system the director 7 half way between the two electrodes will tilt, but the tilt can be in any direction in the xy-plane, seen schematically at 9 in FIG. 1. In other words, the polar angle PA, i.e., the angle that the director makes to a line perpendicular to the plane of the surface of the electrode (i.e., the z axis), will be fixed, but the azimuthal angle AA, i.e., the angle that the projection of the director onto the plane 9 makes to an arbitrarily chosen line in the electrode, e.g., the y axis, will be arbitrary. Unless the azimuthal angle of the director is controlled, for example, by use of the electrode patterns of the present invention, it will be random in a field-on condition.

Figure 2A:
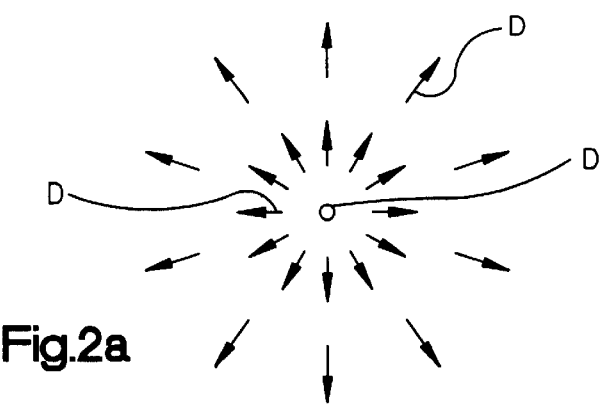
FIG. 2 is a stylized representation of various liquid crystal director orientations in and around defects or disclinations in a liquid crystal cell.

This random orientation of the vector D is not desirable in many applications and it is therefore useful to control the vector D to be approximately the same within one or more domains in which the orientation and magnitude thereof are approximately constant. In a cell in which the substrates have not been treated so as to promote the formation of domains of the vector D there is a slow dynamics when the cell is switched on from the field off condition. Either in accordance with the random dynamic (thermal) fluctuations in the liquid crystal or in accordance with non-uniformities of the cell, the vector D will have various orientations at various places. Since the liquid crystal has a lower free energy when all neighboring molecules are aligned in the same direction, this is a high free energy condition and will, generally, relax or coarsen over time to a more uniform structure. This takes time, however, and generally effectively stops when the pattern formed by the various orientations in the vector D contains structures spaced of the order of 10–20 times t apart, which are often called defects or disclinations and are referred to herein as disclinations. In the center of such a disclination the magnitude of the vector D is zero. As seen in FIG. 2a, which illustrates the vector D configuration viewed along the normal to the substrates, the vector D rotates by 360 degrees as it goes around the center of the disclination. Thus, in the absence of any alignment mechanism the vector D will vary slowly moving through the cell, never forming a clear domain in which it is approximately constant.

Figure 2B:
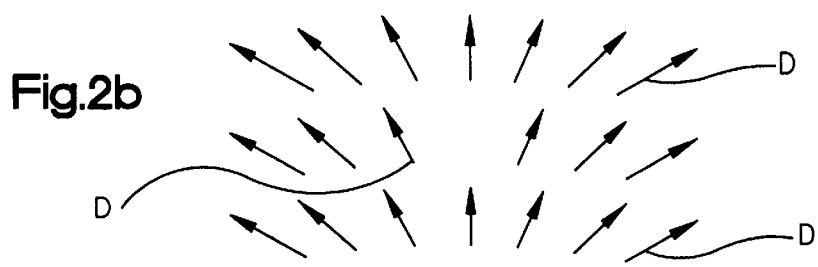
Figure 2C:
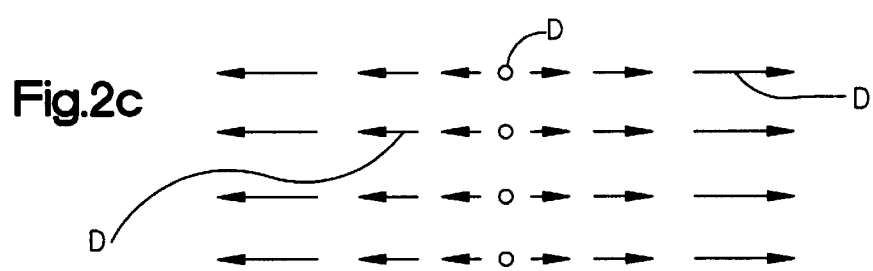
Figure 2D:
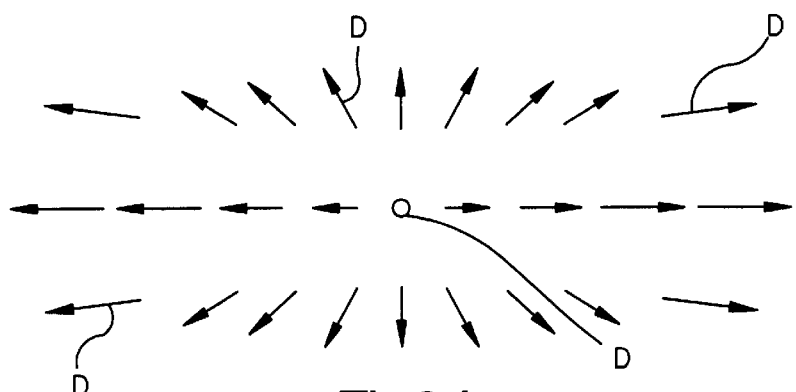

The presence of an aligning mechanism significantly alters the foregoing behavior. In particular, there can now be clear domains bounded by defect or disclination structures referred to herein as domain walls. There are two distinctly different types of domain walls which may form part of a boundary of a domain. A domain wall of the first type, seen in FIG. 2b, is one in which the azimuthal orientation of the vector D within the disclination changes by an angle that is typically less than and, in any case, not 180 degrees. Here, the orientation of the vector D rotates and, while the length of the vector D is likely to decrease, it is never zero. A domain wall of the second type, seen in FIG. 2c, is one in which the vector D changes by 180° but does not rotate within the disclination. Instead, the vector D changes its length, becoming zero at the center of the domain wall. Although disclinations are still possible when there is an alignment mechanism, the nature of the disclinations is distinctly changed. Disclinations will then typically be at the confluence of three or more domain walls or in the center of a domain wall of the first type, as seen in FIG. 2d. Relaxation to one or the other of these domain walls depends upon a number of factors discussed in more detail below.

The width of domain walls, particularly those of the first kind, depends upon the strength of the alignment mechanism, the width becoming shorter with increasing strength of the alignment mechanism. Additionally, domain walls of the second kind will generally become domain walls of the first kind as the alignment strength is decreased. However, there is no sharp boundary at which the vector D ceases to rotate, or at which its length ceases to change. Moreover, the alignment mechanism of this invention will, in general, cause variations in the direction and length of the vector D even without a domain in which the orientation of the vector is substantially similar. Therefore, as used herein, a domain boundary is the location at which the length of the vector D either falls below 50% of the average length it has within the domain, or where the azimuthal angle of the vector D exceeds 30° from the average direction of said vector within said domain. Thus, when moving from inside a domain to the outside of a domain, one reaches the boundary of the domain when either of the foregoing parameters is met. Note that, at the boundary of the pixel or other optical aperture, this domain boundary may be through one side of a domain wall or may contain a disclination or both.

Also of importance is the fact that the azimuthal orientation of the director can also have a sign, in which a vector D assigned to the projection of the director on the xy plane 9 of FIG. 1 is given a sign corresponding to the relative direction the vector points in the xy plane 9. As seen in FIG. 1, the vector D can be associated with each point in the xy plane 9 if the azimuthal angle is not controlled. A sign can be assigned to this vectored projection of the director by choosing an arbitrary line in the xy plane 9 to demark azimuthal orientations wherein the vector D will have opposite sign. Control of the azimuthal orientation so as to control both the direction and sign of D is important in some applications where off angle viewing and control over the number and location of domain boundaries is desired. As will be seen, small scale patterning of non-conducting gaps in the electrodes can be used to control the direction or both the direction and sign of the azimuthal orientation of the liquid crystal director in a field-on condition.

As used herein, simple small scale patterning refers to a pattern of small scale gaps or small scale portions of gaps that, of itself, controls the direction but not the sign of D, whereas complex small scale patterning refers to a pattern of small scale gaps or small scale portions of gaps that, of itself, controls both the direction and sign of D. Small scale non-conducting gaps or portions of gaps are those having at least one dimension in the plane of the electrode that does not exceed about 2.5, and preferably does not exceed about 2.0 times the distance t, which is the cell gap. Still more preferably, small scale non-conducting gaps are defined as further being those gaps having the foregoing dimensions wherein at least a portion thereof is disposed at least about 1.0, and still more preferably about 2.0 times the distance t within the boundaries of any liquid crystal domain, as discussed in more detail below. Likewise, the term gap refers to a non-conducting portion of the electrode surface. It is generally contemplated in the preferred embodiments that the gaps will represent portions of the substrate where the electrode has been removed, such as by etching, with the patterns being formed, for example, by photolithography as is known in the art.

Figure 3:
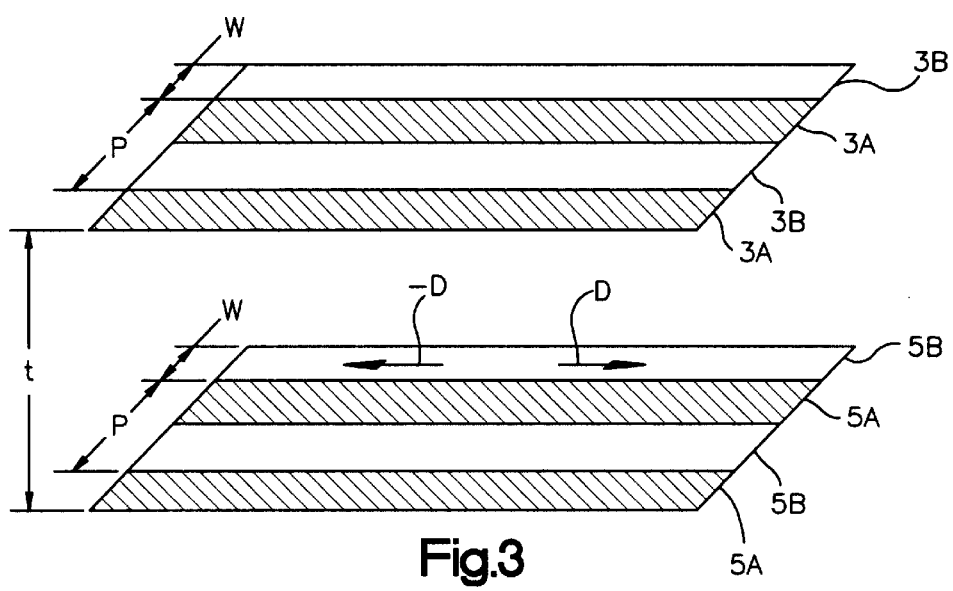
FIG. 3 is a stylized representation of the orientation of a liquid crystal director between electrodes patterned with small scale non-conducting gaps according to the invention.

With reference to FIG. 3 the effect of simple small scale patterning of non-conducting gaps in the electrodes according to one embodiment of the invention is illustrated. FIG. 3 shows a simple striped electrode for a homeotropically aligned, achiral nematic liquid crystal having a negative dielectric anisotropy disposed therebetween. The electrodes are shown at 3A and 5A and the gaps in the electrodes are shown at 3B and 5B. FIG. 3 illustrates the two director configurations possible with the small scale striped pattern shown in a field-on condition. As seen, the vector D is aligned generally parallel to the edges of the non-conducting gaps with the two possible signs of the vector D shown at D and −D. Thus, as can be seen, while the striped pattern illustrated controls the direction of D so as to be parallel to the stripes, the sign of D is not controlled and can be in either the positive or negative direction with respect to, in this case, the y-axis. Thus, as can be seen, the electrode patterns shown in FIG. 3 controls the direction, but not the sign of D.

More specifically, a negative dielectric anisotropy implies that the free energy is lowered when the nematic director is as close as possible to perpendicular to the electric field. As known to those of ordinary skill in the art, the electric field lines begin at one electrode and end at the other electrode and are everywhere perpendicular to the electrodes. Therefore, the electric field lines point obliquely towards gaps 3B and 5B in the electrodes. In the case of a large scale gap having a width greater than about 2.0t in, for example, electrode 3, the electric field would be expected to favor a tilt with the vector D perpendicular to the gap and pointing towards the non-conducting gap and away from the electrode. This is verified for non-conducting gaps having widths equal to or larger than twice the cell gap t and spaced many t apart. However, in a nematic liquid crystal, changes in the direction of the order parameter require elastic energy. For a small scale gap according to the invention the elastic energy is important to the direction of the tilt and is expected to be approximately constant in the cell, with the director most nearly perpendicular to the electric field everywhere when it is parallel to the gap, as seen in FIG. 3. Thus, in accordance with this embodiment of the invention, FIG. 3 depicts small scale patterning wherein the width of the non-conducting gaps or stripes 3B, 5B is between approximately 0.5 and 2.5, and still more preferably 0.5 and 2.0 times the cell gap or thickness t, so as to control the direction of D generally parallel to the stripes.

As noted above, the small scale non-conducting gaps of the invention will have at least one dimension in the plane of the electrode that does not exceed about 2.5, and preferably about 2.0 times the distance t. When one desires to control merely the direction of D within a given pixel, these small scale gaps will be arranged within the pixel such that at least about 60%, more preferably about 75%, and more preferably still at least about 90% of the area within the pixel is within about 1.5 times, and still more preferably within about 0.7 times the distance t from an edge of a conducting portion of the electrode. In addition, when one desires to control both the sign and direction of D within a given pixel or portion thereof, one or more of the small scale gaps will have at least a portion thereof disposed at least about 1.0, and still more preferably about 2.0 times the distance t within the boundaries of a liquid crystal domain in a field-on condition.

As used herein, small scale gaps may be distinguished from large scale patterning. Large scale patterns, because of the physical dimensions of the gaps that produce them, or because of their location, such as their distance from similar gaps or location and orientation with respect to a domain boundary, can be distinguished from the foregoing small scale gaps or portions of gaps, even though they may be contiguous therewith. Those gaps, or portions of gaps, forming a large scale pattern will typically be disposed generally adjacent or along a domain wall in a field on condition. This may be because of the large width of the gap, the effects of the electrodes at its edges, the effects of small scale patterns or a combination of several of these effects. Thus, even though one could characterize a pattern of interconnected, contiguous gaps, such as the gaps in FIG. 4b, as a single gap, portions thereof are distinguishable from one another based upon their location and orientation with respect to liquid crystal domains formed in a field-on condition. In addition, the pattern of the electrodes at the edges of a pixel should, in general, be considered to be part of the large scale patterns. Generally, the electrodes on one or both substrates will end or have a gap at the edge of the pixel and the locations of these edges of the electrode need not be the same on each substrate. Such differences in the location of the edges have substantially the same effects as a wide gap within the pixel and shall be considered a portion of gaps and a portion of the large scale structure in the electrodes.

In addition, large scale patterns created by gaps or portions of gaps in the electrode typically, although not necessarily, have at least one dimension in the plane of the electrode e.g, a length, that is larger than about 4 times t. Frequently, the gaps forming the large scale patterns in an electrode structure will have gap widths larger than that of a small scale gap, i.e., larger than about 2–2.5t. For example, the gaps disclosed in U.S. Pat. No. 5,309,264 have widths that are typically 2t and are all, irrespective of their widths, part of large scale patterns. However, large scale patterns acting in concert with small scale patterns can advantageously have smaller widths than large scale patterns not acting in concert with small scale patterns. Moreover, the maximum width or lateral dimension of a small scale portion of a gap that will be effective to determine the direction and sign of D within a domain can be larger than the minimum width of a large scale portion of a gap that determines the location of a domain wall. Small scale gaps or portions of gaps will preferably cover most of the surface of an electrode with a similar pattern throughout a liquid crystal domain. If a small scale pattern changes, it will nevertheless have a reasonably uniform pattern with the gaps running in generally a uniform direction. By contrast, the longitudinal direction of the gaps or portions of gaps associated with large scale patterns will be in distinctly different directions from one another and from adjacent small scale gaps or portions of gaps, e.g., differing by an angle of more than 20° from the average longitudinal direction of neighboring small scale gaps. Finally, gaps or portions of gaps forming large scale patterns generally work in concert with similar such gaps disposed relatively far away, e.g., more than 5t away, to control the vector D. For example, if two parts of an electrode more than, e.g., 5t away from such gaps or portions of gaps are designed to favor distinctly different directions and signs of D and, moreover, the large scale gaps or large scale portions thereof have a longitudinal direction within 20° of the bisector of the angle between the directions of the vector D most nearly perpendicular to the azimuthal directions of D, then the gap is likely to be adjacent a domain wall between the liquid crystal domains. Thus, as noted, the primary distinction between those gaps or portions of gaps that constitute small scale gaps or patterns, and those that constitute large scale gaps or patterns is that, in a field-on condition, the small scale gaps are mostly within the liquid crystal domains while the large scale portions of the gap are along an adjacent domain boundary. Accordingly, as used herein, the term "small scale gap" refers to either a non-contiguous gap, or a portion of a larger contiguous gap, having the parameters described above.

In any event, with the pattern shown in FIG. 3, an applied field sufficient to induce a Fredrick's transition will cause the director in large regions to align substantially parallel to two possible directions, D and –D, as shown. This is because the director is perpendicular to the component of the electric field that is in the plane of the electrodes and, assuming that the director varies little in the cell, this is the lowest energy configuration. Since each of these two possible director alignments has approximately the same optical properties, this manner of patterning is adequate for many applications. Such applications include improved performance of switchable dichroic absorbing displays, such as disclosed in Japanese patent no. 57-63378, switchable dichroic polarizers, or displays in which the pixels are large enough, or grey scale as a function of angle is unimportant enough so that a random sign of the director does not significantly negatively impact the performance of the display.

If one extrapolates FIG. 3 to represent a pixel or other optical element of a cell substrate, the gaps have a repeated pattern with a spatial period P of less than about 3 times the cell gap t and for which approximately ½ of the electrode within the pixel is missing or non-conducting. It is generally preferred that the majority of the effects of the small scale electrode patterning not be confined to a region very close to the electrode. The major effect of the electrode patterning on the liquid crystal is to modulate the electrical potential and hence produce a modulated field that, in turn, effects the orientation of the liquid crystal. As is known to those of ordinary skill in the art, the size of such modulation in the electric field will decrease exponentially, changing significantly over the distance given by $p/2\pi$ where p is the period over which the electric field repeats. This will correspond to some distance by which the small scale electrode patterning can be translated without change in the pattern. The effect of the electric field on a nematic liquid crystal is primarily quadratic in the electric field. Therefore only products of electric fields are of primary interest in determining the effectiveness of these patterns.

As is known, the effects on the liquid crystal that are proportional to the product of any two such spatially varying electric fields will decay as the product of the two corresponding exponentials. Thus, for effects proportional to the in-plane spatially varying fields, if $p_1$, and $p_2$ are the periods of the two electric fields involved and t is the cell gap, it is desirable that the sum $t2\pi/p_1+t2\pi/p_2$ not be too large compared to unity. Additionally, there is the uniform electric field that does not decrease in the cell. Thus, effects that are proportional simply to the product of this uniform field and a single spatially varying field have the weaker constraint that $t2\pi/p$ is not large compared to unity. Finally the magnitude of the spatially varying component of the electric field increases rapidly as the area of the electrode that has been removed at a given period increases. In contrast, provided the period(s) is(are) small enough, the magnitude of the uniform field decreases relatively slowly when the conducting electrode is replaced by non-conducting gaps. Thus, it is generally advantageous to have a significant part of the electrode removed, as large aligning fields are desirable. Generally speaking, moreover, for this and other preferred embodiments, the more small scale gaps or small scale portions of gaps the better, particularly with larger pixels. As one increases the number of small scale gaps or small scale portions of gaps one will tend to maximize the advantages associated with the invention as long as one remains within practical parameters of manufacturability and does not reduce the amount of conducting surface to a point where sufficient vertical electric field strengths can no longer be maintained. Preferably, in this and other preferred embodiments of the invention, at least about 60%, more preferably 80° and, more preferably still, at least about 90% of the area of a given pixel or other optical aperture of a substrate surface will be within about 1.5 times, and still more preferably within about 0.7 times the distance t from an edge of a conducting portion of an electrode.

Although FIG. 3 illustrates the preferred small scale patterning suitable for controlling the direction of D in perhaps its simplest form, other generally linear parallel patterns of generally linear small scale non-conducting gaps may be used. The important constraint is that the width of the non-conducting gaps in the electrode be no more than about 2.5, and still more preferably less than 2.0 times the distance t. More particularly, in a given pixel on a cell substrate, which will typically have a length and a width on the order of from about 50×150 to 200×600 microns in the xy plane parallel to the plane of the substrate, a non-conducting small scale gap or portion of a gap according to this embodiment of the invention will generally have one dimension in the xy plane that is substantially longer than the other dimension. If this dimension is taken to be the length of the gap in the longitudinal direction, then the width of the gap will be taken to be no more than about 2.5, and still more preferably 0.5 to 2.0 times the thickness t. If the sole issue in making a device were the difference in the size of the in-plane fields perpendicular to a chosen direction (e.g., the stripe direction) and those parallel (or anti-parallel thereto) then the simple striped pattern shown in FIG. 3, with an appropriate period and gap width will be generally preferred. Deviations from this pattern result in either a decrease in the parallel fields or an increase in the perpendicular fields. However, there are a number of issues in addition to the sizes of the in-plane fields. Moreover, as long as the parallel fields are sufficiently large in comparison with the perpendicular fields, alignment of the orientation of the vector D is expected, although this may become slower and more sensitive to randomness.

Manufacturability is one issue which may make modifications of the striped pattern advantageous. For example, for large pixels, the very long, thin "wires," i.e., long thin portions of the ITO electrode remaining after correspondingly long thin gaps are etched in the ITO, may have defects resulting in an open circuit and hence in sections of the electrode which are not connected to the voltage source. When the pixel includes a plurality of such gaps in a repeating pattern having their longitudinal directions generally parallel, as in the case of stripes, then one can control the direction of D as seen in FIG. 3 even when the non-conducting gaps are not purely rectangular in shape as in FIG. 3. For example, gaps having such widths may be sinusoidal or zig-zag, as long as the net effect of the width, longitudinal direction and period of the gaps is to control the direction of D of the liquid crystal adjacent the electrodes and gaps so as to be generally parallel to the longitudinal direction of the pattern of gaps, and as long as this effect is not canceled out by the pattern of gaps on an opposite electrode or other gaps within the pixel. The effects of such patterns can be enhanced by using more such gaps and preferably so that at least about 60%, and still more preferably at least about 90% of the area of a given pixel or other optical aperture of a substrate surface will be within about 1.5 times, and still more preferably within about 0.7 times the distance t from an edge of a conducting portion of an electrode. Regions distant from any small scale gaps or patterns are consistent with many orientations of the director and so in general will have slower dynamics which may ultimately result in disadvantageously long lasting defects. Moreover, it is generally advantageous if both electrodes are patterned with small scale gaps according to the invention. Of course, the length of such non-conducting gaps can run the entire length or width of a pixel, or cover only a portion thereof. Suitable longitudinal gap shapes and patterns, i.e., other suitable linear parallel patterning, in accordance with this embodiment of the invention will be apparent to and/or can be empirically determined by those of ordinary skill in the art in view of this disclosure.

Although alignment can be achieved by using small scale patterning on one electrode while employing no patterning, e.g., a continuous electrode, on the opposite substrate, superior control of alignment is obtained by preferably employing small scale patterning on both electrodes. In the case of an achiral liquid crystal, the preferred small scale striped patterning of FIG. 3, or comparable generally linear parallel patterning that induces suitable control over the direction of D, should be parallel on both substrates. By contrast, if the liquid crystal is chiral, then the director will generally rotate from one electrode to the other. In such a system the direction of the stripes or other generally linear parallel patterning should be likewise rotated with respect to the opposite substrate by an amount slightly less than the amount by which the director rotates. This is because each stripe pattern effects the director near but not at its electrode. The larger the ratio of the period of the patterning P to the cell gap t the smaller the angle by which the top and bottom patterns should be rotated. As will be apparent to those of ordinary skill in the art, the distance over which the in-plane fringing fields penetrate into the liquid crystal is approximately $P/2\pi$. The square of these fields, which is what effects the azimuthal orientation, penetrates approximately $P/4\pi$. The angle of rotation should be adjusted so that the orienting influences of the two electrodes agree with each other. This implies that the angle between the stripes on the two electrodes is close to the angle by which the azimuthal orientation rotates in the region between $P/4\pi$ above electrode 5 and $P'/4\pi$ below electrode 3. If both electrodes have stripes or other linear parallel patterning then there are, in principle, effects of the relative displacements of the stripes or linear patterns. In most cells these effects will be largest if the stripes are parallel. However, these effects only result in additional electric fields perpendicular to vector D, which have not been observed to adversely effect performance in accordance with the invention. Thus, close registry of the substrates for such applications is not critical.

As will be apparent from FIG. 3, controlling only the direction of D can result in the random creation of liquid crystal domains wherein some regions of the liquid crystal will align so as to exhibit predominantly one sign of D, while other regions will exhibit predominantly the opposite sign of D. The domain walls that separate these distinct director alignments are optically dissimilar from the domains themselves. For applications where the optical properties of the domain walls or disclinations are important, mere control of the direction of the director in accordance with the foregoing embodiments of the invention is insufficient. For these applications the two alignments possible with the exemplified striped patterning, or equivalent generally linear parallel patterning, must be controlled. This can be done by controlling not only the direction but also the sign of D in the presence of a field. In accordance with the invention, this can be done using complex small scale patterns, complex or simple small scale patterns in combination with large scale patterns, or either of the foregoing in combination with surface treatments that promote a preferred tilt angle of the liquid crystal.

In one embodiment, both the direction and sign of D can be controlled using simple small scale patterning according to the invention in combination with large scale patterning, similar to those disclosed in U.S. Pat. No. 5,309,264 to Lien et al., incorporated herein by reference. In the presence of an electric field, the patterning of non-conducting gaps within a given pixel will create one or more liquid crystal domains within the pixel, each domain being defined by an area of liquid crystal in a plane parallel to the plane of the electrode in which the azimuthal orientation of the liquid crystal molecules is predominantly of the same direction and sign. In this embodiment, the simple small scale patterns of non-conducting gaps function in the manner described above, so as to control the direction of D within a given domain, while large scale patterns of non-conducting gaps, or the combined effect of the large and small scale patterns, serves to induce the sign of D in that domain.

In most preferred embodiments the large scale patterning of non-conducting gaps will be such that the liquid crystal adjacent a given pixel will exhibit multiple domains in the presence of an electric field. Here, large scale patterns will tend to define or be coextensive with the walls of each domain, with simple small scale gaps or portions of gaps having at least a portion thereof a distance of at least about 1.0 times the distance t, and preferably at least about 1.5–2t or more from any domain boundary. Alternatively, the non-conducting gaps can be patterned so as to create a single domain within a given pixel, such as where the large scale patterns are disposed at the edges of the pixel, with the small scale gaps being disposed within the area of the pixel itself.

The advantageous result of controlling both the direction and sign of D in this manner is to be able to control the number and location of domains, and hence the number and location of optically dissimilar domain walls within a given pixel or number of pixels. Moreover, the combined use of both large and small scale patterning is superior to the use of large scale patterning by itself since it results in fewer possible defects and faster switching.

FIG. 4 illustrates various combinations of large and small scale patterning suitable for use with a chiral nematic liquid crystal having negative dielectric anisotropy. One of ordinary skill in the art will be able to adapt these and other patterns to other liquid crystal materials and cells in view of the present disclosure. FIG. 4a is a stylized illustration of an electrode pattern for a given pixel viewed along the normal to the substrates. Here the conducting portion of the electrode is represented by the shaded regions. Such patterning would be suitable for a chiral nematic liquid crystal with a left-handed pitch. In FIG. 4a the large scale gap patterns are the widely spaced horizontal gaps, indicated at 6 in the top electrode 3 and at 8 in the bottom electrode 5, and the small scale gaps are defined by the non-conducting spaces between the slanted comb-like portions of the shaded electrodes 3B,5B, respectively. In such a cell the substrates are separated by a distance t of about 5 μm and the non-conducting small scale gaps 3B, 5B, have a width approximately equal to t. Likewise, the width of the conducting portions of the electrodes 3A, 5A are also approximately equal to t. The distance d forming the large scale gaps between sets of diagonal electrodes is 2t. The electrode pattern thus described will create three liquid crystal domains A,B,C indicated generally at brackets A, B and C, in which the direction of D at the center of the cell is the same, but wherein the sign of D, shown at D and –D, is different and predominantly the same within the respective domains A, B and C. Optically, the boundaries of domains A, B and C will be defined at domain walls along gaps 6 and 8. Of course, FIG. 4a is merely representative of a portion of a pattern which may repeat for a substantially larger portion of the pixel to create numerous additional domains and domain boundaries, not shown. As can be seen, the small scale non-conducting gaps 3B, 5B are disposed predominantly within the domains and include at least a portion that is a distance of at least 2t from the domain boundaries. It is also seen that no portion of the substrate within domains A, B and C is more than 1t from the edge of a conducting portion of an electrode. FIG. 4a also illustrates the relative angular displacement of the small scale non-conducting gaps on the top and bottom electrodes used for chiral nematic liquid crystals. As noted, the angle that these gaps on the top electrode make with respect to the gaps in the bottom electrode is slightly smaller than the natural rotation of the liquid crystal moving through the cell.

Figure 4A:
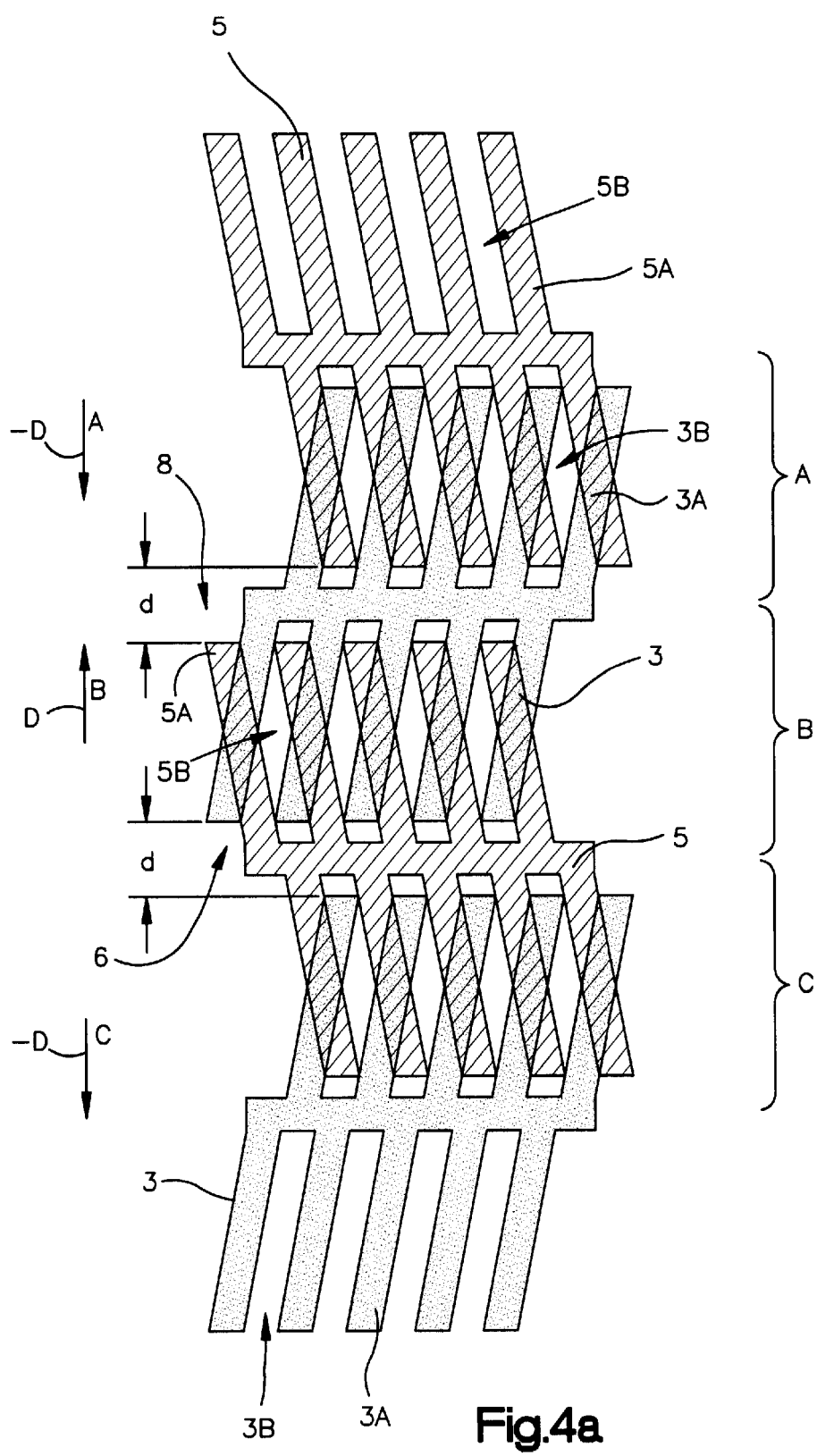
FIGS. 4a–e provide a stylized representation of two electrode patternings according to the invention.

Of course, the pattern shown in FIG. 4a is merely illustrative and the dimensions of the non-conducting gaps and conducting electrodes can vary without departing from the invention, as will be apparent to those of ordinary skill in the art in view of this disclosure. Notably, the patterning seen in FIG. 4a will be defect-free as long as the horizontal widely spaced gaps 6, 8 forming the large scale patterns are also quite wide, on the order of twice the cell gap or more. This is because in the preferred domain structure the azimuthal angle rotates by approximately 180 degrees in the domain wall. If the gap is not wide enough, then the tilt in the center of the gap is non-zero. If the gap is not sufficiently large to result in a 180 degree domain wall of the second type it is possible for there to be two somewhat different orientations in a single domain, corresponding to rotation by somewhat less than 180° in different directions upon passing through the large scale gap. These two slightly different orientations will be separated by a disclination in the center of the large scale gap as illustrated in FIG. 2d. These different orientations will generally result in unfavorable behavior. This problem could, in principal, be controlled by appropriate changes in the small scale pattern, e.g., by making it favor one or the other of the two possible rotations. However, this problem is unique to 180 degree domain walls. Hence, in circumstances in which not all of the desired domains have orientations 180 degrees apart it is likely superior to have domain walls with angles other than 180 degrees. This will also generally advantageously increase the luminance as the domain walls with smaller angles are generally narrower. In addition, although they may have undesirable viewing angle behavior they are more luminant, and this is generally desirable.

Figure 4B:
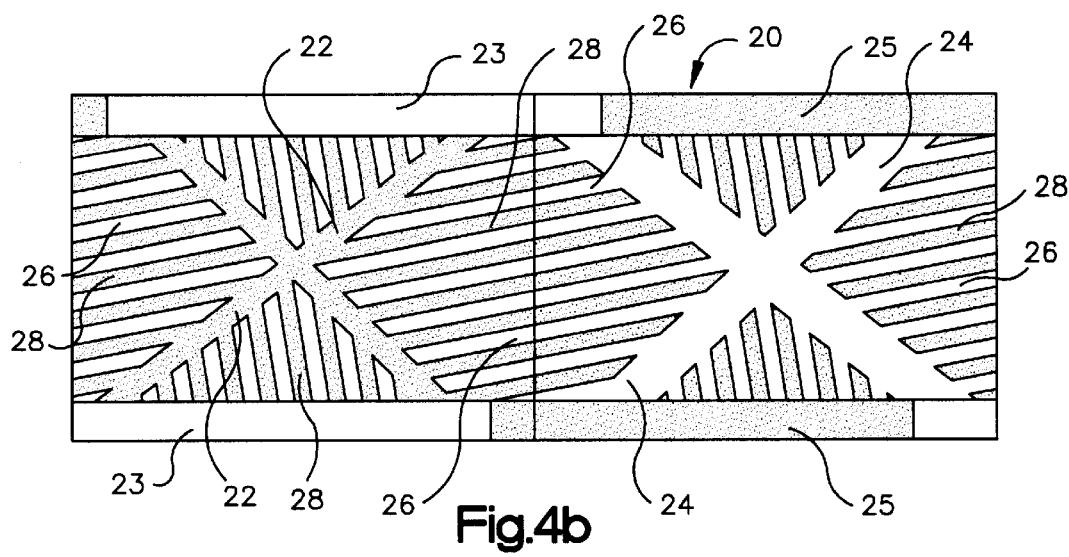
Figure 4C:
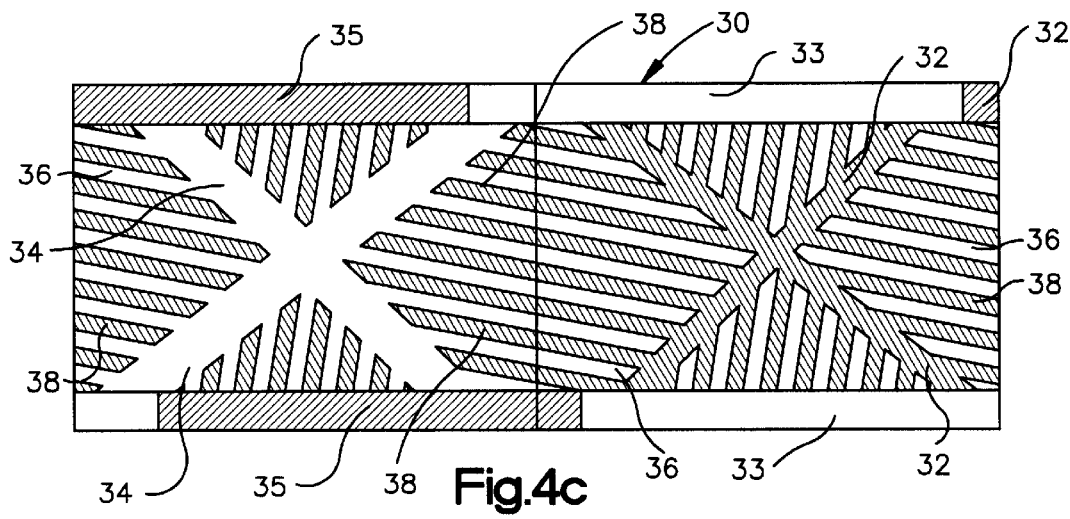
Figure 4D:
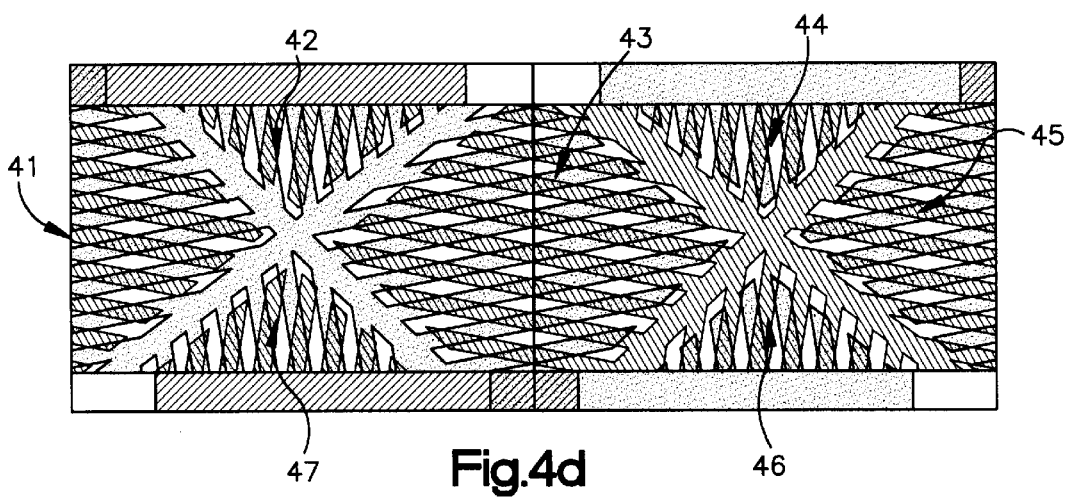
Figure 4E:
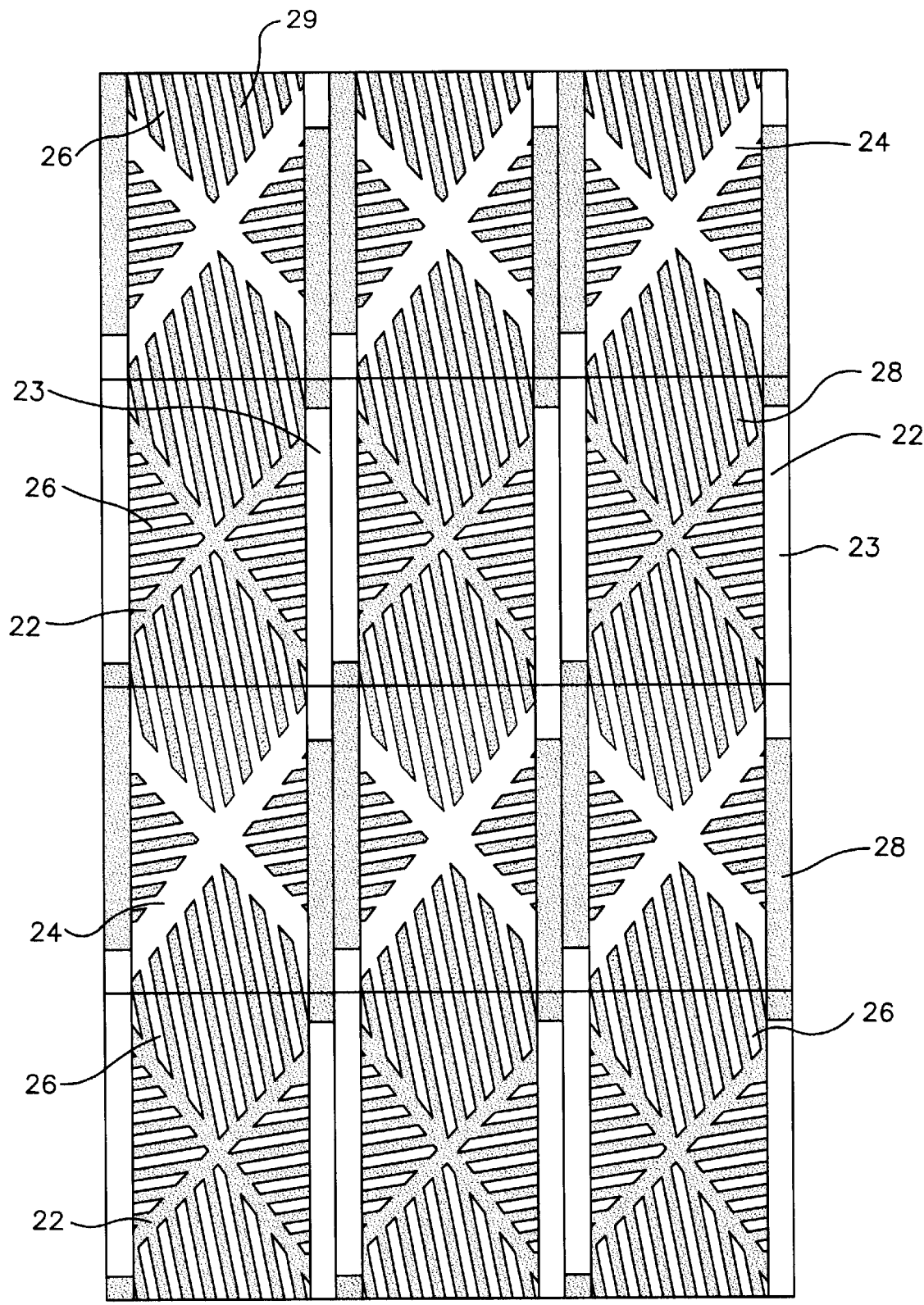

FIGS. 4b–e illustrate an electrode combining large scale patterns of non-conducting gaps, and simple small scale non-conducting gaps which will produce multiple liquid crystal domains in which the domain walls are never 180 degree domain walls, but rather 90 degree domain walls. Again, viewing the pattern as it would appear along the normal to the substrate, FIGS. 4b and 4c show bottom and top electrodes, 20 and 30, respectively, while FIG. 4d illustrates the registry of the electrodes when disposed one on top of the other in a cell. As can be seen, the patterns are identical except that the top electrode has been rotated by 180 degrees with respect to the bottom electrode around the vertical axis normal to the substrates. The conducting electrode in FIGS. 4b–4e is shown by the shaded regions, while the non-conducting gaps are shown by the non-shaded regions. As illustrated, the cell gap t between the electrodes of 4b and 4c is 5 $\mu$m and the pattern shown defines a pixel that is 20.8t wide and 56.8t long. The non-conducting gaps 24, 34, seen as unshaded x's are 3t wide, respectively, and form large scale patterns. The diagonal conducting electrodes 22, 32, seen as shaded x's are 1.6t wide. The unshaded gaps 23, 33 forming large scale horizontal patterns are 2t wide, as are the electrodes 25, 35. The small scale non-conducting gaps 26, 36 and the conducting electrodes 28, 38 are 1t so that the period of the small scale striped pattern is 2t. The pixel created in 4c will create 7 liquid crystal domains 41 through 47 separated by boundaries along the large scale patterns 24, 34. As with the pattern of FIG. 4a, the small scale non-conducting gaps or gap portions are disposed predominantly within the domains and include at least a portion that is a distance of at least 2t from the domain boundaries. It is also seen that no portion of the substrate within domains 41–47 is more than 1.5t from the edge of a conducting portion of an electrode. As can be seen in FIG. 4e, the patterns of 4b and 4c can form an individual pixel or other optical aperture of the cell, or form a portion of a repeating pattern which fills a larger portion of the cell.

As noted, in still another preferred embodiment both the sign and direction of D can be controlled by using appropriate complex small scale patterning on one or both of the electrodes, without any large scale patterns of gaps, although large scale patterns can, if desired, be used in conjunction therewith.

Determining the sign as well as the direction of the vector D solely using small scale gap patterns requires generally more complex patterns than simply determining the direction of D. This is because, as mentioned above, there can only be very small net average in-plane electric fields associated with two electrodes whose in-plane dimensions are much larger than their separation t, and these fields result primarily from the boundaries of the electrode. Thus, since the only large uniform field (that along the normal to the electrodes) does not determine the sign of D, there is no way to use the products of uniform electric fields within a simple, e.g., striped, small scale pattern to determine the sign of the vector D. Hereinafter, we describe two techniques which, either separately or in concert, can be used to determine the sign of the vector D. Each of these embodiments involves more complex electrode patterns wherein variations in the size or direction of the vector D, which correspond to variations in the electrical fields, together will favor one sign of the vector D over the other. This can be done by varying either the magnitude or the direction of the vector D.

It is possible to cause the variations in the electrical potential and the vector D either with patterns on a single electrode or by the interaction of patterns on opposing electrodes. For a periodic system of gaps for producing domains in which substantially all of the liquid crystal directors are to have the same sign of the vector D, the variation in D and the variation in the electrical potential must have the same period and, for best results, be displaced from each other by a particular fraction of a period. In a non-periodic system there would be similar constraints. However, if the two electrodes, in concert, determine both the variation in the vector D and the variation in the electrical potential, then the relative displacement of these two variations will be controlled entirely or in part by the relative displacement or registry of the patterns on the opposing electrodes. As it is advantageous for the period of a pattern to be small, this will require good control over the registry of the electrodes. This is consistent with, but difficult, using current manufacturing techniques.

Figures 5A, 5B:
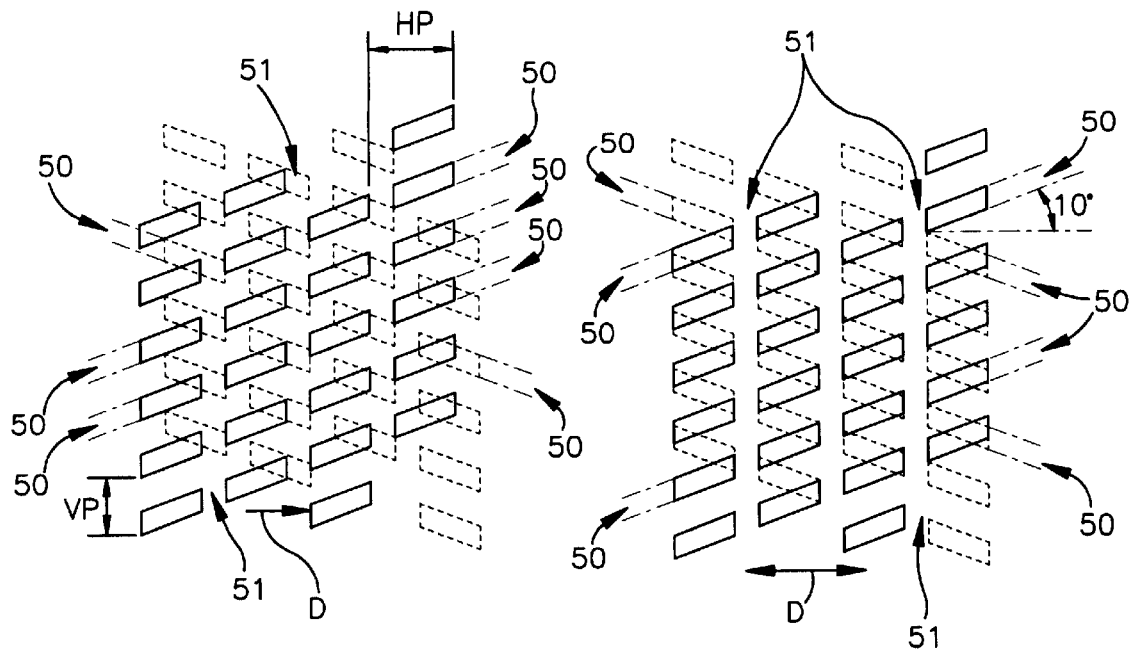
FIGS. 5a–d provide a stylized representation of another electrode patterning according to the invention.

Patterning each electrode as shown in FIG. 5a results in alignment of the sign and direction of D. This results from a variation in the magnitude of D, which has the same period as a variation in the electrical potential. However, it does require appropriate registry of the electrodes, though only in one direction. Below we will use the terms "horizontal" and "vertical" to describe the orientation in the plane of the figure within the usual sense of those terms relative to the bottom of the page. The electrode of FIG. 5 consists of a simple pattern of gaps of nearly horizontal stripes, indicated generally by dashed lines 50, which have been rotated in different directions on opposing electrodes by 10 degrees, in accord with the above discussion concerning a striped pattern in a chiral material. This pattern, however, has been modified by interrupting the striped gaps with a number of vertical electrodes or "wires" seen generally at 51. Advantageously, this results in a multiply connected electrode so that unintentional openings in the electrode are less likely to result in an open circuit. The stripes shown have a period of 2 times t in the vertical direction, indicated at VP, and the horizontal period is 3t indicated at HP. The horizontal stripes were rotated 10 degrees and the conducting and non-conducting parts are of equal width. The vertical wires 51 are 1t wide.

Figure 5C:
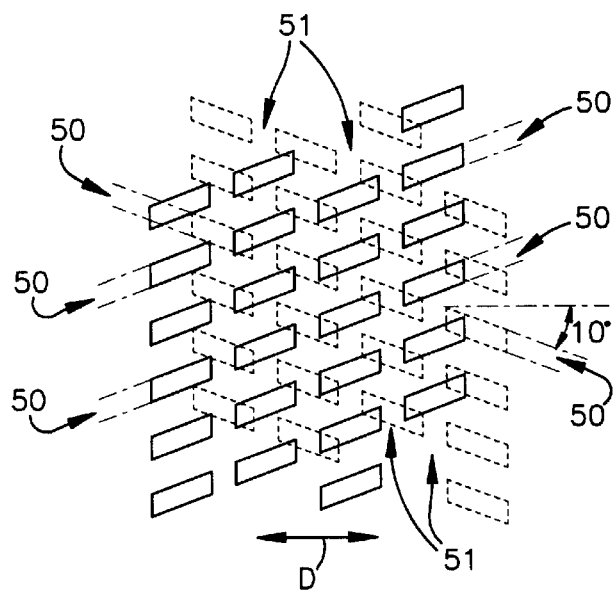

In the foregoing pattern the approximately (rotated 10°) horizontal stripes 50 result in horizontal alignment of the director, independent of any change in the registry of the electrodes. This happens despite the effects of the horizontal electrical fields due to the vertical wires 51. The vertical wires 51, in addition, cause variations in the magnitude of the field along the normal to the substrates, thus causing changes in the magnitude of D. They also cause horizontal fringing fields. If, as is shown in FIG. 5a, the electrodes have been displaced relative to each other in the horizontal direction by a quarter period in either direction, then the magnitude of the vector D is larger in the half period covered by either of the two vertical wires 51, and smaller in that half period where the two vertical wires do not overlap. The fringing fields near the center of said first half period are, in consequence, of more importance than those in said second half period. As a result, the favored orientation of D in this cell is horizontal. Its sign is such that the orientation of the liquid crystal director at the center of the cell is more nearly perpendicular than parallel to the shortest lines connecting the centers of any pair of adjacent vertical wires that are disposed on opposing substrates. Clearly, however, when the electrodes are displaced relative to each other by any number of half periods in the horizontal direction, as seen in FIGS. 5b and 5c, this effect is irrelevant and the sign of the vector D is not controlled. Intermediate displacements result in intermediate levels of control of the sign of D. Thus, unless the registry of the electrodes can be controlled to within 0.6 times t this specific pattern cannot be used to predictably control both the sign and the direction of D. Most displacements will, with varying speed, control the sign of D. However, unless the registry can be well controlled this pattern cannot be used in conjunction with large scale or other patterns which also control the sign of D. Thus, for a nominal cell gap of 5 μm, these electrodes require registry, at least in one direction, with an error of at most 3 μm in order to control the sign of D. This is within the capabilities of current manufacturing techniques.

Figure 5D:
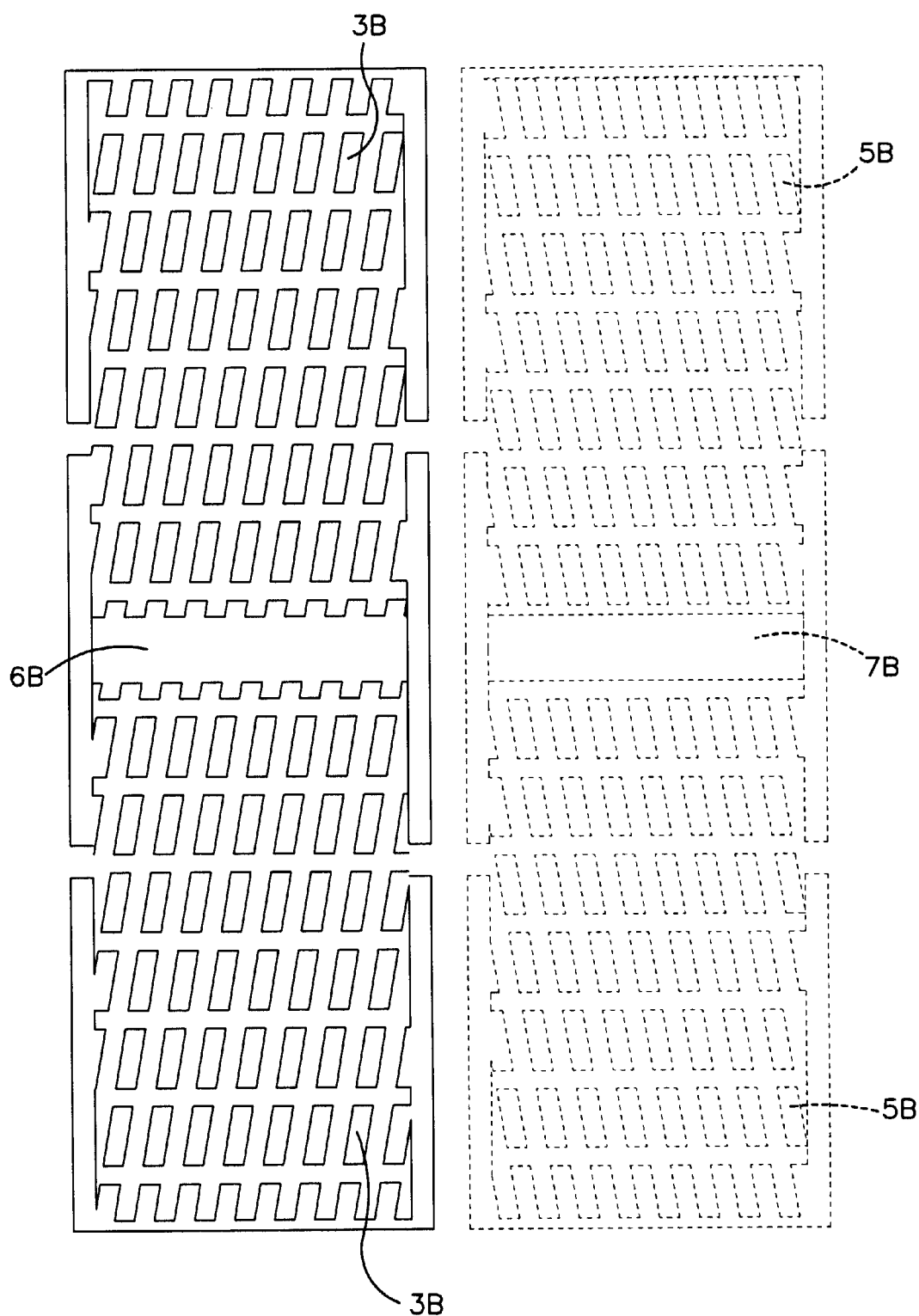

FIG. 5d illustrates the pattern of FIG. 5a (rotated on the page 90° on the page) as it would appear in a pixel. The non-conducting gaps in the top and bottom electrodes, represented by the parallelograms 3B, 5B, respectively, are 1t wide and 3t long. Large scale gaps 6B, 7B are 3.2t wide. If the top and bottom electrodes in the illustrated pixel are properly registered, then both the sign and direction of the vector D can be controlled within the pixel.

Clearly, many electrode patterns will obtain the same results as that shown in FIG. 5a. These fields, and the patterns that give rise to them, need not be periodic. However, periodic patterns are advantageous in several ways. Only one repeating pattern or unit cell need be designed. Moreover, except at the edges of a pixel, a specific periodic pattern is likely to be best for any given purpose. However, many distortions from a periodic pattern will not significantly effect the performance of the pattern. The primary constraints on such a pattern are that the in plane fields be sufficiently larger in one direction than in the other to effect alignment of the direction of the vector D. Hence the striped pattern is a useful point of departure in such designs. It is also required that there be fields parallel to the expected (or empirically determined) direction of the vector D. The spatially varying structure along the vector D must result in variations in the magnitude of the vector D (which will increase where less of the electrode has been removed). There must also be fringing fields that must be in one direction where the magnitude of the vector D is large and in the other direction where the magnitude of the vector D is small so as to average to zero. Many such patterns will be striped patterns wherein the width of the stripe varies periodically along the direction of the vector D.

Another useful concept in the design of such electrodes is the point group of the electrode pattern, as this constrains the possible patterns. Those of ordinary skill in the art are familiar with this term as described in, for example, R. L. E. Schwarzenberger, "n-Dimensional Crystallography," Pitman (London) 1980, incorporated herein by reference. The point group of a system is the rotations and reflections of space that leave it unchanged. Such rotations or reflections may be accompanied by translations. This is useful because the point group of the distortion e.g., in a non-chiral vertically aligned nematic liquid crystal cell, has a point group consisting of four motions namely, nothing, rotation by 180° around an axis passing through the center of the cell, perpendicular to the normal to the substrates and the nematic director at the center of the cell, and a mirror reflection through a plane whose normal is the axis of inversion. If the nematic is chiral, the point group has only two elements, nothing and the aforementioned rotation. If a proposed electrode pattern is unchanged by any other rotation or, in a non-chiral system any other reflection, or even if this is true locally and approximately, the proposed pattern cannot, locally, determine the sign and direction of D. If we consider a value of the vector D, either predicted in some way or determined empirically, this value of D and the value of said vector, changed by said rotation or reflection, will be equivalent but different so that the vector D will not be determined up to this difference. For example, the striped pattern and the pattern of FIG. 5, registered as shown in FIGS. 5b and 5c, are both unchanged by rotations by 180° around at certain locating normals to the substrates. This rotation changes the sign but not the direction of D. Hence, as observed, these patterns determine only the direction and not the sign of the vector D. If the system is chiral but close to non-chiral, e.g., in the sense that the pitch is large compared to t, or to the distances described below giving the distance over which the electrode patterns have their effect, it is advantageous, although not required, that the electrode satisfy the constraints discussed above for the achiral system.

On the other hand, if the patterns on the two electrodes are unchanged when rotated by 180° around any axis passing through the center of the cell then the resultant electric fields will align D, if at all, perpendicular to this axis. This predictably is advantageous in the design and empirical determination of working patterns. The pattern of the electrode on each substrate in FIG. 5 is unchanged by a rotation by 180° around an axis normal to the substrate and passing through the center of any parallelogram, which would be inconsistent with alignment of the sign of D. However, if the substrates have proper registry, the pattern on both electrodes is not invariant under any such rotation. However, if a pattern is desired that does not require registry in order to determine the sign of D, the pattern itself must have a smaller point group. Specifically, the only symmetry element possible for a single electrode in this case is a mirror reflection through a plane including the vector D and the normal to the electrode. One of ordinary skill in the art will be able to determine other patterns in accordance with this embodiment in view of the present disclosure.

As noted, in another preferred embodiment there are patterns of small scale gaps or small scale portions of gaps that, by themselves, can determine both the direction and sign of the vector D. This obviates the need for any close registry between electrodes, which is desirable for ease of manufacture.

Figure 6A:
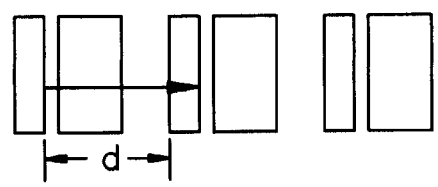
FIG. 6 illustrates the concept of space groups useful in designing electrode patterns according to the invention.
Figure 6B:
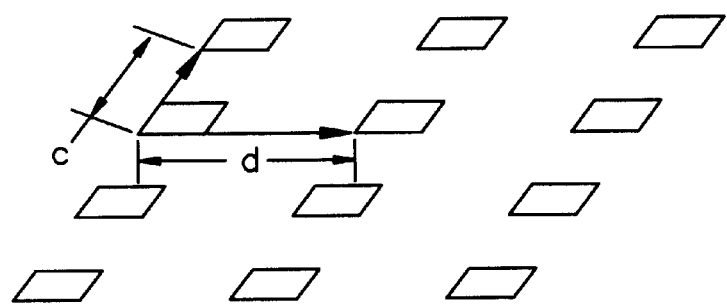
Figure 6C:
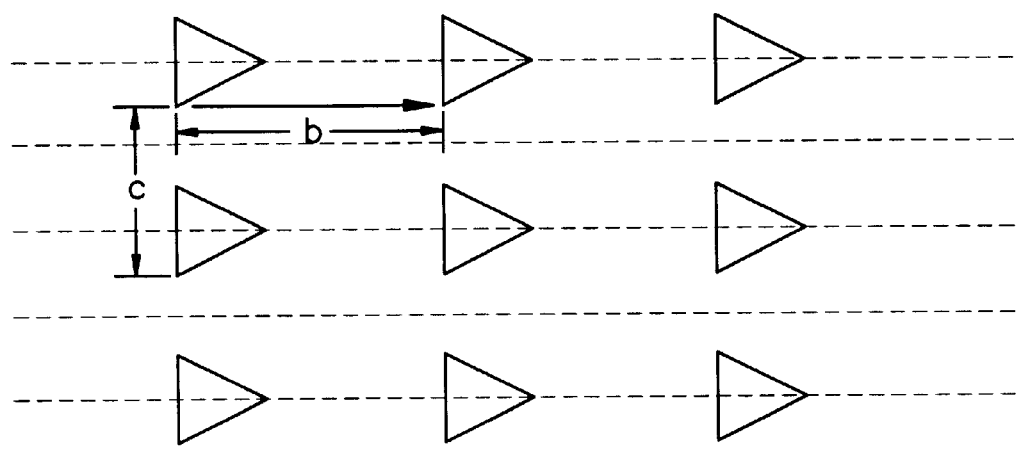
Figure 6D:
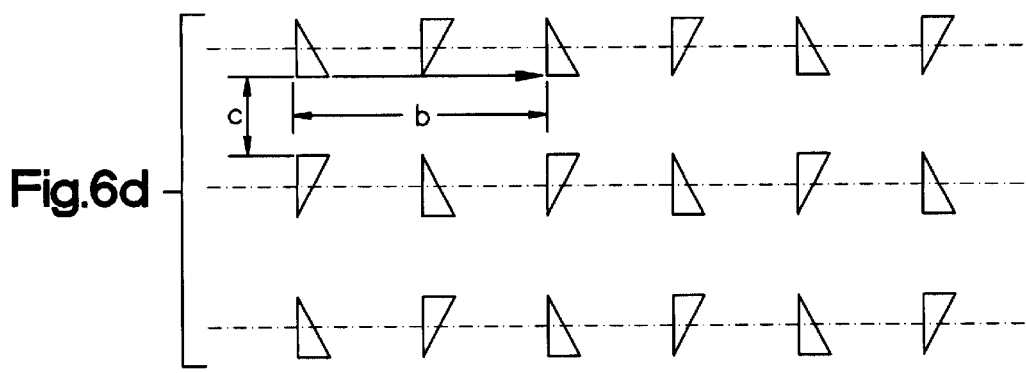
Figure 6E:
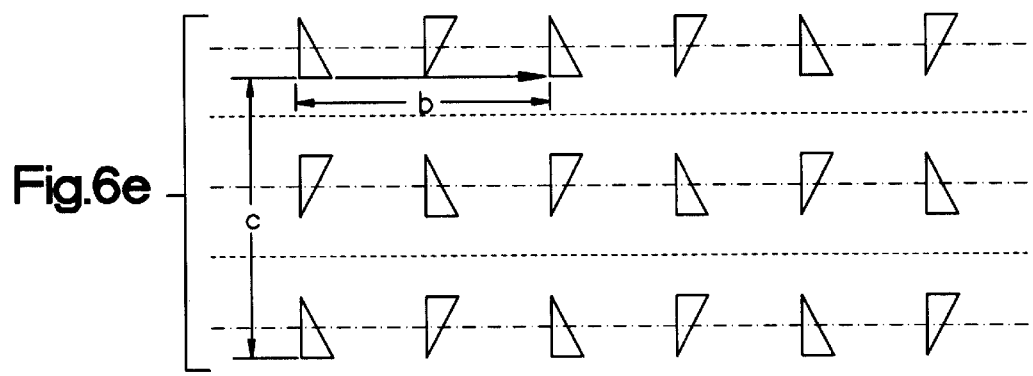

If the electrode pattern is periodic or substantially periodic in a given region then one can consider particularly preferred space groups for the patterning to obtain the desired results. These space groups imply that the lattice is taken into itself with certain motions, as seen in FIG. 6. Those of ordinary skill in the art are familiar with space groups as described in, for example, R. L. E. Schwarzenberger, *n-Dimensional Crystallography*, Pitman (London) (1980), incorporated herein by reference. Depending upon the liquid crystal, some space groups will be better suited to control the sign and direction of D. Specifically, there are only four two-dimensional space groups consistent with a uniform vector in the plane of the electrode and therefore consistent with control of the sign of D. With reference to FIG. 6, these space groups are the two-dimensional space groups Pl, Pm, Pg and Cm. Two additional possibilities are the one-dimensional space groups Pl and Pm. In both one and two dimensions the point group of Pl is the "trivial" group consisting of doing nothing. The point group of Pm, Pg and Cm also includes a mirror plane. FIG. 6a illustrates the one dimensional space group Pm, while FIGS. 6b–e illustrate the two dimensional space groups Pl, Pm, Pg and Cm, respectively. The arrows show the smallest translations that leave the pattern unchanged. A reflection through the dashed lines leaves the pattern unchanged. Likewise, a reflection through a dot-dashed line, if combined with a translation in the direction of a dot-dashed line (i.e., a glide reflection) leaves the pattern unchanged. As there are an infinite number of mirror planes in the one-dimensional space group Pm, these are not illustrated. The distance and direction "lattice vectors" b and c, which describe the size and shape of the lattice, are also shown. However, such a periodic patterning of small scale gaps in the electrode will effect the director primarily through the electrical potential. If such a potential is periodic in one direction it has a mirror plane including that direction, so only Pm need be considered in one dimension.

As explained above, for a periodic pattern and, to good approximation more generally, the electrical potential and the corresponding electric field near an electrode envisioned herein are a field parallel to the normal of the substrates and an electrical potential and its corresponding field which varies in the cell. It is convenient to expand these spatially varying fields and the corresponding potentials in terms of two-dimensional spatial harmonics. Two dimensional spatial harmonics are functions of the form $\cos(kx+k'y)$ where $(k,k')$ is the wavevector, x and y are coordinates in the plane and it is assumed that the argument of the cosine is in radians. This function should then be multiplied by a function which depends on z, the direction parallel to the substrate normal. However, if we are considering the effects of only a single electrode, then, for the potential, this function of z is a simple exponential. It is useful to describe the system in terms of harmonics because the vector D will tend to adjust itself so that it minimizes the free energy of the system. The electric field will enter this free energy in complex ways, elaborated upon below. However, as a general rule only products of any number of electric fields the wavevectors of which can be added (or subtracted) to yield zero can enter the free energy. Moreover, it is generally expected that smaller numbers of electric fields are better and will result in larger, more effective terms in the potential. Thus, without being bound by theory, this allows us to place restrictions on the electrode patterns, as discussed below.

In order to determine the sign and direction of D the relevant electrical potentials, together, must satisfy the constraints on the point group discussed above. Examining sets of harmonic functions for the correct point group we find that if only a small number of terms are desired then two harmonics (the fundamental and the first harmonic) are required if the electrical potentials corresponding to the electric fields vary in the same direction, vis $\cos(kx)$ and $\cos(2kx+\delta)$) referred to hereinafter as the 1-d harmonic set, where x is a spatial coordinate, k is $2\pi/p$, p is the period over which the electrode repeats and $\delta$ is a number between 0 and $\pi$, exclusive, and is preferably close to $\pi/2$. As noted above, it is assumed herein that the argument of the cosine is in radians. This set of harmonic functions, like any set of harmonic functions the wavevectors of which are all parallel, has a mirror plane parallel to the yz-plane. However, when $\delta$ does not equal 0, $\pi$ there is no 180° rotation around a normal nor any other mirror plane.

Three terms, the wavevectors of which can be added or subtracted to equal zero are required for the correct point group if the wavevectors are not in the same directions e.g., $\{\cos(kx+\delta), \cos(k(1-a)x+k'y), \cos(kax-k'y)\}$ where k' is a parameter controlling the period of the pattern in the y direction, a is a constant and the remainder of the variables are as previously noted. The second of these functions has $k(1-a)$ as the x component of the wavevector and k' as the y component. However, if the magnitudes of any two wavevectors are equal, this set will have a mirror plane normal to the wavevector not of equal magnitude. Note, however, that this mirror plane exchanges the amplitudes of the two harmonics so that if these are different, this is not a mirror plane. However, the effects we will consider below are proportional to the products of the amplitudes so that this distinction is unimportant and such a plane is still, in effect, a mirror plane.

The foregoing implies that the wavevectors can not all have equal magnitude as, in this case, there are three mirror planes not all of which are parallel. A simple rule of thumb for assessing whether or not a set of potentials corresponding to a set of wavevectors is or is not advantageous is useful. Again, without being bound by theory, there is a general constraint on terms in the free energy that they should be independent under interchange of the names given the various parts (e.g., harmonics) of the electrical potential or field. In order for these potentials to determine the vector D it must be possible to determine a vector, with the correct orientation, from the potentials. Examining this possibility for simpler vectors than D, the potential V(x,y,z) can be written as a sum ($\Sigma$) over different wavevectors $k_j=(k_{jx},k_{jy})$ indexed by j as $V=\Sigma_j A_j \exp(i(k_{jx}x+k_{jy}y))$, where $A_j$ is the complex amplitude which depends on z. Note that this is distinctly different from the discussion of patterns of FIG. 5, which determine the sign of D through a mechanism that depends upon both electrodes. For our discussion we choose to take z, the distance from one of the electrodes, to be zero. $A_i$ (or $A_{i0}$) is a complex number consisting of a real and imaginary part $A_i=a+ib$, where i is the square root of $-1$. Because the potential V is real for every non-zero wavevector $k_j$ there must always be a wavevector $k_{j'}=-k_j$ such that $A_{j'}=A_j^*=a-ib$ where * indicates the complex conjugate. The actual values of the complex amplitudes depend on the choice of the origin e.g., where x and y are zero. However, for any triplet of wavevectors which sum to zero, that is $k_j+k_m+k_n=0$ the product $V=ik_j k_m \cdot k_n A_j A_n A_m$ is independent of the origin. Here $k \cdot q = k_x q_x + k_y q_y$ indicates the dot product of two vectors. Summed over all six possible permutations or exchanges of the vectors $k_j$, $k_m$ and $k_n$ and also over their negatives and exchanges of their negatives $k_{j'}$, $k_{m'}$ and $k_{n'}$ this determines the real vector. This is the simplest vector that can be formed from the electric fields corresponding to these harmonics and which, like all terms that enter the free energy, is symmetric under interchange of the electric fields. Of course, the product of this function with any function of the k's which is symmetric under interchange of the k's also satisfies this property (or is zero). For example, the product $ik_j A_j A_n A_m$, appropriately summed is always zero, because of the constraint $k_j+k_m+k_n=0$. It is easy to calculate V for any set of three wavevectors, in order to verify if this set is likely to be useful in determining the sign of D. Specifically, if this is calculated for the two wavevector set $\{A\cos(kx), B\cos(2kx+\delta)\}$ it is easy to see that it is in the x direction and is proportional to $A^2 B\sin(\delta)$, as suggested by the fact that this set has mirror planes for $\delta=0,\pi$.

While electric fields perpendicular to D are required to determine the sign of D they are disadvantageous as they also decrease the tendency of D to align. This tendency is proportional to the square of the magnitude of $A_j$, $A_j A_j^*$, and also to the square of the cosine of the angle the wavevector makes to the x axis. Thus, it is desirable if V, and similar vectors, are as large as possible for given values of $A_j A_j^*$. This can be arranged by changing the relative phase of the waves ($\delta$). A wide variety of vectors constructed as above have a largest contribution for any given triplet of wavevectors and their negatives the same result for this relative phase given the aforementioned constraint on magnitudes. It is also easy to see that in space groups containing glide reflections, that is to say if the system is left unchanged by a reflection combined with a translation which translation is a smaller distance than any translation in the same direction that, by itself, leaves the system unchanged, then the phases of the complex amplitudes of certain triplets of wavevectors are necessarily such as to maximize V with the above constraint. Hence, the space groups Cm and Pg are advantageous as they contain such glide reflections and so satisfy this constraint automatically.

This phase criterion also makes it clear that, should these three harmonics not all arise from the same electrode, then close registry between electrodes will be required. Specifically, translating one electrode relative to the other by ¼ of the period of any harmonic will change the phase criterion from advantageous to disadvantageous (as e.g, changing $\sin(\delta)$ from 1 to 0). Hence, unless close registry is possible, it is desirable for an electrode to itself give rise to all three harmonics.

Given these general constraints one can evaluate the effects of electric fields on the director so as to develop suitable patterns according to the invention. The direct effects of electric fields are primarily quadratic and are associated with the dielectric anisotropy. However, there are substantial indirect effects of electric fields on liquid crystals with higher, even, powers of spatially varying fields, the largest contributions coming from the reorientation of the liquid crystal. There are also flexoelectric terms proportional to odd powers of the electric field involving spatial changes in the liquid crystal director. These latter are typically small and have symmetry and other properties not dissimilar from those of the effects proportional to even powers, which are discussed below.

If we are interested in effects proportional to even powers of the electric field, then we must consider effects proportional to three powers of the spatially varying fields and an odd number of powers of the uniform field across the cell. There are two essentially different types of effects of such fields, namely, polar torques that change the magnitude of D, that is, the amount by which the director tilts in the center of the cell, and azimuthal torques that change the direction of D. Both types of torque can arise either through fields in the xy-plane or through a combination of fields in the xy-plane and along the z-axis. The largest field along the z-axis is the uniform field. Thus, to good approximation, both torques are either proportional to the product of two spatially varying fields in the xy-plane or to one spatially varying field in the xy-plane and the uniform z-axis field. The effects of azimuthal torques are generally larger than the effects of polar torques i.e., twisting the director is generally easier than changing its magnitude. However, it is also expected that the free energy is quadratic in the torques, such that changing the direction of all torques should not change the sign of the energy. Thus, it is desirable to consider terms involving an even number of torques. If we involve only three spatially varying fields this implies using zero or two torques as each torque involves one or two spatially varying fields.

Figure 7:
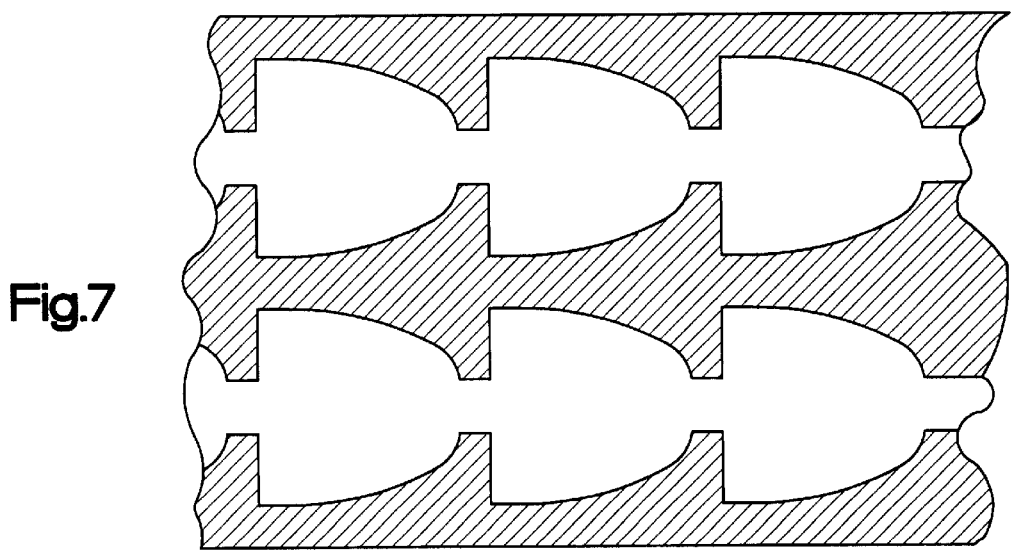
FIG. 7 illustrates an electrode pattern that can be used to control the direction and sign of D in accordance with the invention.

The primary fundamental interaction between the liquid crystal and the field is the dielectric anisotropy. Qualitatively, changes do not result from other interactions, such as flexoelectricity. Thus, provided the chiral pitch is sufficiently large the polar torques are approximately proportional to either $D \cdot EE_z$ or $(D \cdot E)^2$. Here $E_z$ is the electric field along the normal to the plane of the electrodes. This implies that the electric fields giving rise to polar torques should, in so far as possible, be parallel to the direction of D. Parallel electric fields that, potentially, determine the sign of D can be generated using an electrode with the one-dimensional Pm space group. However, it is observed in small scale patterned electrodes that the direction of D tends to be perpendicular to the in-plane electric fields. Thus, either the patterning on the opposite electrode or an additional patterning on this electrode, adequate to induce the appropriate orientation of D is required. Such electric field can, potentially, be generated by electrodes with patterning in two dimensions, that is the 2–d space groups Pm or Pl. An example of such an electrode is shown in FIG. 7. FIG. 7 illustrates a pattern with two dimensional Pm symmetry that is expected to have large and appropriately phased first and second harmonics along the x-axis, in addition to appreciable electric fields along the y-axis. In the figure the non-conducting gaps are represented by the non-shaded regions. As electrodes with this character must have electric fields parallel to the x-axis to work it may be that they will result in poor or no alignment. In consequence a preferred embodiment is to use only one such electrode and to use a simple striped pattern as the counter electrode. Said electrode should be oriented as described above for opposing striped electrodes with the stripe direction being the horizontal direction in this figure i.e., the direction along which the wires are continuous.

Terms in the free energy involving two azimuthal torques are expected to be larger. The two azimuthal torques, provided the cholesteric pitch is long, are approximately proportional to $D \cdot E\ \epsilon_{ij}D_iE_j$ and to $\epsilon_{ij}D_iE_jE_z$ where i and j are indices summed over the components in the xy-plane and $\epsilon_{ij}$ is the completely antisymmetrical matrix with respect to the interchange of its indices e.g., $\epsilon_{xx}=\epsilon_{yy}=0$; $\epsilon_{xy}=-\epsilon_{yx}=1$. The former term is large when the angle between E and D is 45 degrees, the latter when this angle is 90 degrees. There are two possible ways to include two azimuthal torques and three electric fields in a term in the free energy, namely the product of these two azimuthal torques and the square of the first one times a polar torque. In each of these instances it is required that there be electric fields with a variety of angles to D. It follows that a two-dimensional electrode patterning is required.

Consistent with the foregoing, we now consider in more detail the advantageous characteristics of patterns with two dimensional space groups and which cause azimuthal torques. Given the appropriate phase relationships in the space groups Cm and Pg we first consider patterns with these groups. It is convenient to choose the x axis to be part of one of the mirror planes of these groups, which is also the direction that is horizontal in FIG. 6. An essential constraint on an electrode that determines the sign of the vector D is that it determine either by itself, or in concert with the other electrode, the direction of D. Advantageously, it will itself determine the orientation of the vector D. In order to do so it must give rise to fields perpendicular to the x axis. This is easily done using the simple striped pattern and, generally, edges of the electrode parallel to the x axis are desirable for such fields. Thus, patterns like those of FIG. 8, which are derived from the simple striped pattern simply by moving the edges without changing how the wires are connected are advantageous starting points for the design of such electrodes. In order to determine the sign of D it is also advantageous to have triplets of wavevectors like those discussed above with appropriate phase relationships.

Figure 8A:
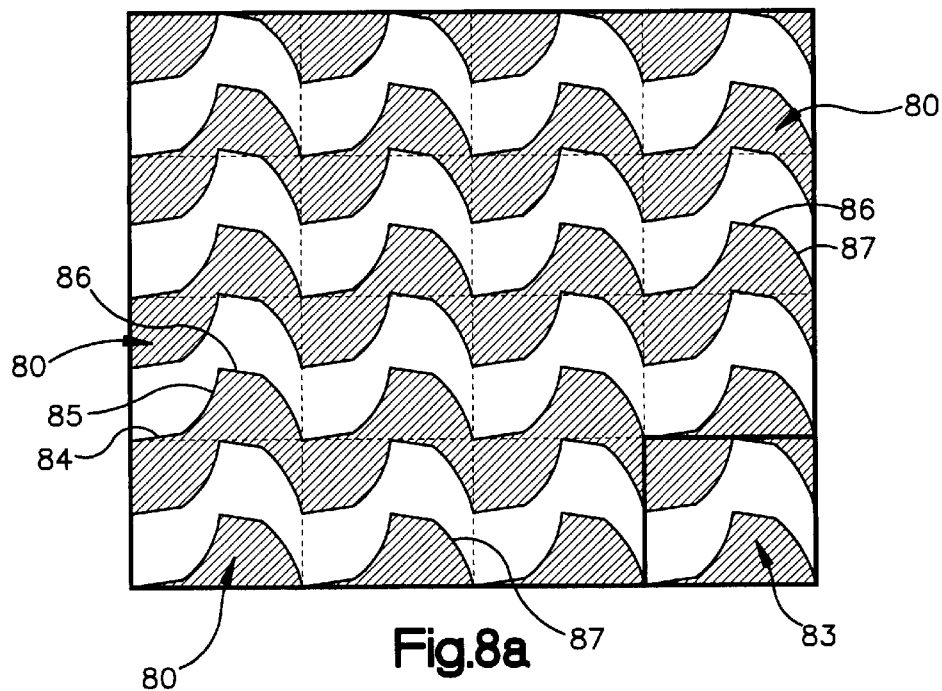
FIG. 8 illustrates additional electrode patterns that can be used to control the direction and sign of D in accordance with the invention.
Figure 8B:
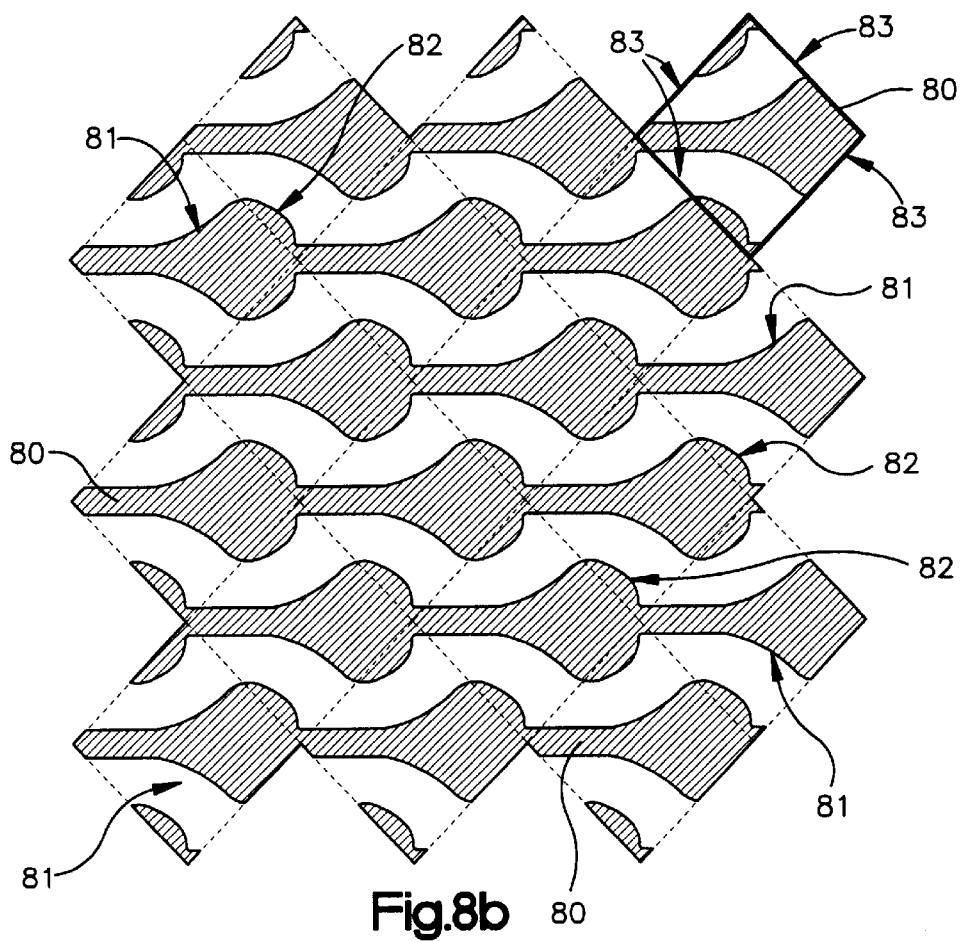

Desirable triplets of wavevectors that will determine alignment of the sign of D parallel to x can be determined by one of ordinary skill in the art in view of this disclosure. The wavevectors of a lattice can always be parameterized by a pair of integers. The wavevectors consistent with the space groups Pg and Cm can both be expressed in terms of integers. All wavevectors will have an x component of the wavevector gn where g is related to the period in the x direction and a y component g'm where g' is related to the period in the y direction. We will symbolize such wavevectors by (n,m). Triplets of wavevectors must add to zero and so can be parameterized by (n,m) (n',m') and (−n−n', −m−m'). If n=n' so −n−n'=0 then if m=m' or m=0, the triplet does not distinguish between the positive and negative x-axis. There are similar constraints when n=0 or n'=0. If D is to align parallel to the x-axis then it is desirable that the electrical potentials associated with the (0,m) wavevectors should be large. For identical reasons it is desirable that the electrical potentials associated with (n,0) and other wavevectors substantially parallel to the x-axis should be small. Thus, it is desirable that (0,m) wavevectors but no (n,0) wavevectors be included in triplets which cause the alignment of the sign of D. It is also desirable that wavevectors included in triplets have small magnitude as this implies that the distance which the electric field penetrates the liquid crystal is not too small. This means that $r^2n^2+m^2$ should be small, where r is the ratio of the period in the x direction to that in the y direction, or that n and m be small. Potential triplets with small magnitudes are A: $\{(1,1), (-1,-3), (0,2)\}$, B: $\{(1,0), (1,0), (-2,0)\}$, C: $\{(1,1), (1,-1), (-2,0)\}$ and D: no n or m's are zero. Class B is difficult to realize as all the wavevectors involved are the form (m,0) and it is desirable that the amplitudes of harmonics of the electrical potential with these wavevectors be small. Thus, classes A, C and D are preferred. For these classes it is desirable that a wavevector with both n and m non-zero be substantial. This suggests that space groups Pg and Cm are preferable. It is known that in Pg the amplitudes of the electric field associated with (n,0) is zero for odd n. In Cm n+m must be even for the electric field to be non-zero, yielding a similar constraint. Thus, in each of these space groups vectors with non-zero n and m have larger magnitudes and therefore are more likely to contribute to the alignment than the (n,0) wavevectors, which may cause inappropriate alignment. The patterns of FIG. 8 embody these design criteria. FIG. 8a is a Pg pattern which gives rise to appreciable fields belonging to the set $\{(02),(11), (-11)\}$. FIG. 8b is a Cm pattern which gives rise to appreciable fields belonging to the set $\{(02),(11),(-11)\}$. Both, of course, also give rise to other wavevectors. Both have been observed, by themselves, to control both the sign and direction of D.

If the liquid crystal is chiral, then it is easy to see that the optimum electrode patterning should not have a mirror plane. Specifically, consider an optimum electrode pattern which, however, is constrained to have one or more mirror planes. If a small distortion is made from such an electrode for an achiral system, then it will have a very small effect, likely proportional to the square of the size of the distortion. However, such a distortion is expected to have a larger effect, proportional to the size of the distortion rather than to its square, on a chiral system, as it will result in electric fields that twist in either appropriate or inappropriate ways for that chirality. It follows that the optimum electrode in a chiral system is very unlikely to have a mirror plane. Thus, for somewhat chiral liquid crystals it is expected that small distortions from these space groups, each of which has such a mirror plane, are desirable. Preferred embodiments of this invention also have, both in free space and in an actual liquid crystal cell, significant amplitudes for these harmonics of the potential and the correct phases for the wavevectors that control the direction and sign of D. As will be apparent to those of ordinary skill in the art, many small changes in the electrode pattern will not substantially change such amplitudes and so will not significantly effect performance of the cell. It will also be apparent that small changes, specifically slight twists of the structure will imply superior behavior when the chiral twist of the structure is significant. Specific preferred embodiments of these electrodes are shown in FIG. 8.

The pattern of 8b, which controls the sign and direction of D is most readily understood in terms of edges of electrodes. Specifically, this pattern consists largely of closely spaced gaps 80. Here, the conducting electrodes are shown as the unshaded regions. These gaps have edges that, on both sides, have a ratchet-like shape, the unit cell of which is represented by lines 83. Moving in one direction along the average horizontal direction of the gaps, the edge has a small slope moving away from the center of the gap, shown generally at 81, and a relatively larger slope moving toward the center of the gap, shown generally at 82. The gap itself will result in fringing fields which will therefore tend to twist the vector D in opposite directions on the top and bottom of the gap, in a way that depends on the sign of the vector D. Similarly, the edges with small slopes will tend to twist the vector D in opposite directions on either side of the gap in a way that does not depend on the sign of D. Finally, the edges with large slope will tend to twist the vector D in the opposite direction as the edges with the small slope which are tilted in the opposite direction of the same side of the gap. However, the edges with large slope are shorter than those with small slope. As a consequence, while the tendency of the edges to twist the director does depend on the angle (and increases with small angle) the effect of the edges with small slope is larger. Hence, this pattern results in larger total torques and smaller total free energies when D has a particular sign. In the pattern of FIG. 8a the edges of the gaps have several different angles with respect to the average longitudinal direction of the gaps. The pattern, again moving to the right in the figure, has both a relatively slow increase of the magnitude of the angle which the edge makes to the center of the gap 84, followed by a substantially larger increase 85. As seen, the gap then includes a relatively smaller slope 86, followed by a relatively larger slope 87 moving toward the center of the gap. The fields resulting from the regions where the edge moves away from the center of the gap, together with the adjacent regions where the edge moves towards the center of the gap have similar effect to those regions in FIG. 8b with smaller angles relative to the average longitudinal direction of the gap. Hence, this pattern also results in alignment of the sign and direction of D.

FIG. 8a illustrates a Pg electrode pattern, while FIG. 8b illustrates a Cm pattern. In each case it is desirable that the cell gap t be comparable to the shortest distances by which the electrode can be translated without change, i.e., the unit cell illustrated by the boldly lined squares 83, on order of 12 $\mu$m horizontally and 10$\mu$m vertically in the Pg pattern, and 11 $\mu$ along the diagonals in the Cm pattern, which are, respectively, 2.4, 2 and 2.2 times the 5 $\mu$m cell gap t. However, if the ratio of the separation between edges and the distance between teeth on the sawtooth edges are much larger or smaller than t, there will not be an effect. Nevertheless, most electrode designs consistent with the above will have appreciable effects, which effects can be adjusted by changing this relative separation, all of which can be determined empirically by those of ordinary skill in the art in view of the instant disclosure.

It will be apparent to one of ordinary skill in the art in view of the foregoing that, in general, the most important aspect of the small scale patterns in this embodiment is the shape of the gaps. It is generally advantageous to have closely spaced gaps as in the periodic patterns discussed above. However, in general, a wide variety of patterns may be useful, such patterns having gaps which may be the same or different. Moreover, while the gaps may be interconnected, in this embodiment they are not connected within an adjacent liquid crystal domain. Thus, in the preferred embodiment, periodic patterns of small scale gaps suitable for controlling both the sign and direction of D will generally have a width in the plane of the electrode not greater than about 2.5, and still more preferably less than about 2.0t, and a length in the plane of the electrode on the order of at least about 4 times the distance 1, which length corresponds generally to at least one dimension of said domain in a plane parallel to the plane of the electrode. Still further, although the width of such gaps will vary as in, for example, FIG. 8, such that the edges of the gaps are not all parallel to the centerline of the gap in the longitudinal direction, the gaps themselves are largely parallel in the longitudinal direction and, still more preferably, such that the centerlines of adjacent gaps will not vary by more than about 20° from one another. In accordance with the foregoing, if the centerline of the gap in the longitudinal direction is arbitrarily called the x direction, and one of the directions perpendicular thereto arbitrarily oriented and called the positive y direction, a gap shape favorable for determining both the sign and direction of D will generally meet the following parameters:

1) the edge which has the larger value of y, for the larger part of the centerline, will exhibit relatively rapid increases in the value of y at the edge followed by relatively slow decrease (in the arbitrarily chosen positive x direction) and/or the edges which have the smaller value of y, for the larger part of the centerline, will exhibit relatively rapid decreases in the value of y at the edge followed by relatively slow increase (in the arbitrarily chosen positive x direction); or, 2) one or both of the edges will exhibit an increasingly rapid increase in the value of y, followed by an increasingly rapid decrease in the value of y; or, 3) a combination of the characteristics in 1 and 2.

Specifically, suppose that the conducting portion of the electrode is largely stripes along a specific longitudinal direction, with the gaps between the electrodes small in comparison to approximately 2 times the cell thickness t. Then the average director an appropriate distance from that electrode will align approximately parallel to the average direction of the stripes, as seen in FIG. 3. If the stripes are too curved, then the director will not align appropriately. However, if the stripes are not too curved but also not straight and parallel as in FIG. 3, then the fringing fields associated with the curved edges of the wires will, locally, tend to twist the director. They do this in two ways. First, there is a tendency of the director to be parallel to the local direction of the edge of the wire. This is quantified by the $D \cdot E \; \epsilon_{ij} D_i E_j$ azimuthal torque. As for the striped electrodes, this tendency does not depend on the sign of the mid plane director. Second, there is a tendency for the director to tilt away from the gap in the electrode and towards the conducting part of the electrode. This is quantified by the $\epsilon_{ij} D_i E_j E_z$ azimuthal torque, which does depend on the sign of D.

It is advantageous if each of these torques, over any region with typical size large compared to the cell gap, will tend to cancel itself, as this will imply that the director is, on average, parallel to the wires. As an example, this can be achieved by having the torques on either side of a conducting or insulating part of an electrode be in opposite directions. This is an advantage of the space groups Pg and Cm, as the glide reflections in these groups imply such a local cancellation. However, in general, there can be a net effect of these tendencies to twist on the average direction of the director, rotating the director from a simple local average to the direction of the wires. In addition to this average twist, there will be a torque or tendency to twist on the length scale on which the wires curve. The distance between the peaks in such a sawtooth pattern should therefor be on the order of 1.5 to 5t.

By definition, the remaining local torques will average to zero over length scales large compared to the length scale on which the wires curve. However, these twists can either tend to work in the same or in opposite directions, and will generally work in the same direction in some parts of a region and in the opposite direction in others. Moreover, they will be in the same or opposite direction dependent upon the sign of D. The free energy of a configuration will be lower when these different torques, on average, are in the same direction rather than in the opposite direction, as the difference between the free energy and the free energy of the state in which the director is uniform is proportional to the square of the net torque. Provided the curves in the wire are appropriately chosen there will be an appreciable difference between the tendency of these torques to be in the same or opposite directions, dependent on the sign of D. This can be done by appropriately choosing the harmonic content of the fourier transform of the field, or by making the edges of the wires have an appropriate curved or ratchet shape as illustrated in FIG. 8.

The above design rules, together with empirical determinations of the effects of the electrodes are adequate for one of ordinary skill in the art to determine working patterns. However, again while not being bound by theory, it will also be apparent to those of ordinary skill in the art that, in principal, it is possible to determine patterns by more precise but more elaborate techniques.

There exist well-known numerical methods, often called relaxation methods, for calculating the electrical potential near an electrode of any shape as discussed in e.g., Numerical Recipes in C: The Art of Scientific Computing by William H. Press et al., University Press, Cambridge (1993), incorporated herein by reference. Thus, it is possible to predict the nature of the electrical potential near any electrode, particularly a periodic one. This does not imply that any set of electrical potentials can be achieved near a particular electrode, which must be flat and electrically connected. However, this technique will enable optimization of electrodes. Such optimization may proceed by simply calculating the electrode pattern which gives rise to some desired electrical potential within a cell. This can be done by iteration, that is by calculating the electrical potential associated with a particular electrode pattern and then altering the electrode pattern so as to more closely conform to the proposed electrical potential. A superior way of doing this is to calculate both the electrical potential distribution and the liquid crystal order parameter. This can be done by minimizing the well-known elastic energies of the liquid crystal as described in, for example, R. Cohen et al., "Theory and Applications of Liquid Crystals," J. L. Ericksen and D. Kinderlehrer, Springer-Verlag, New York (1987), pp. 99 et seq., incorporated herein by reference, together with the electrical potential. Examination of this free energy as a function of the pattern of the electrode as a function of possible deviations of the vector D from the desired orientation will allow unambiguous determination of preferred electrode patterns. A simpler technique is simply to find an appropriate linear combination of the desired spatial harmonics of the electrical potential with the correct relative phase as a function of the location in the plane of the electrode. If the region in which the function is positive is connected and substantially stripe-like, then this region can be used as a pattern for the conducting part of the electrode. This generally, to a first approximation, gives rise to the desired harmonic behavior of the electrical potential.

While the foregoing discussion is useful for the design of electrodes, it is not required. For an electrode or pair of electrodes acting together, to determine the sign of D consistent with the present invention it is required that either there be large scale patterns in addition to small scale patterns, or:

a) The electrodes together or, advantageously, one or both by themselves, give rise to a plurality of spatial harmonics of the electrical potential within a given liquid crystal domain;

b) the spatial harmonics have a period between 0.5 and 8 times the distance t;

c) at least some triplets of said plurality of spatial harmonics (which triplets may include a specific harmonic twice) have wavevectors that, when added together, equal zero, and, either i) one of said harmonics by itself and the other two harmonics, acting together, result in spatial variations in either the magnitude or direction (or both) of the vector D such that these variations have the same sign when D has one sign and have a different sign when D has the other sign, or ii) the complex amplitudes of some of said triplets of harmonics, evaluated at one of the substrates, when multiplied together have a large imaginary part, or iii) the complex amplitudes of some or all of said triplets having a range of magnitudes of said wavevectors, when multiplied together and also multiplied by the sum over permutations of the wavevectors of one wavevector times the dot product of the other two wavevectors and summed or integrated over this range of wavevectors results in a sum or integral with a large imaginary part.

Use of such an electrode will result in somewhat non-uniform alignment in the liquid crystal cell. This non-uniform alignment must be considered in modeling the optical properties of the cell. If two such electrodes are used then, if the liquid crystal is chiral, relative rotation of these electrodes, as for the striped electrodes, is advantageous. However, the non-uniform alignment of the liquid crystal implied by one of these electrodes will interact with the fields due to another electrode. This may result in misalignment, or a need for good registry between the electrodes. Thus, in some preferred embodiments the electrodes are rather different, e.g., have different spatial period or have different patternings or one is unpatterned or has a simple striped pattern.

In view of the foregoing, it will be apparent to those of ordinary skill in the art that there are numerous complex small scale electrode patterns that can be devised according to the invention which fulfill the constraints that the small scale non-conducting gaps or gap portions have at least one dimension that does not exceed about 2.5t, and more preferably 2.0t, and which have at least a portion thereof that is at least about 1.5t, and more preferably 2.0t, within the boundary of an adjacent domain, such gaps being patterned within a pixel or other optical element of the substrate such that at least about 60%, more preferably about 75% and, more preferably still at least about 90% of the area of said pixel or optical element is within about 1.5t, and still more preferably within about 0.7t, from the edge of a conducting portion of the electrode. Suitable such patterns will be apparent and/or can be empirically determined by those of ordinary skill in the art in view of the present disclosure.

As noted, yet another method of controlling both the direction and sign of D is to employ small scale patterning according to the invention, as described above, in combination with the treatment of one or both substrates so as to promote a tilted alignment of the liquid crystal molecules. By treating at least one of the substrates to promote a preferred tilt angle, the liquid crystal molecules in a given region or domain of the cell can be predisposed to exhibit an orientation having a preferred sign of D within the domain. In a preferred embodiment, one surface is treated to promote a homeotropic alignment with a preferred direction of tilt, such as by rubbing. Using the small scale patterning of the invention on the opposite substrate will determine the orientation of the director near the patterned electrode. As will be clear to those of ordinary skill in the art, such small scale patterning is substantially easier and will result in fewer non-working devices than patterning of the rubbing. Similarly, for small rubbing strengths the in-plane electric fields due to such small scale patterning can be used for an IPS switching device. Of course, in an active matrix device it will generally be preferable to use the small scale patterning of the invention on the electrode with the active matrix and to rub the opposite substrate. Suitable surface treatments will be apparent to those of ordinary skill in the art in view of this disclosure and include $SiO_x$, polyimide and the like.

These and other features of the invention are further elucidated by the following non-limiting examples. For the following examples, a plurality of cells were made as follows. 1.5"×1.75" ITO (indium tin oxide)-coated glass substrates were purchased from Applied Films Corp. The resistance of the ITO layer is about 200 ohms. The ITO patterns were generated using ICED, a software package from IC Editors Inc., and the masks were manufactured by Cognizant. In the photolithography processing of the ITO glass, photoresist S1818 from Shipley was exposed 15 seconds under a UV source of a mask-aligner made by Karl Süiss. After developing the photoresist, the ITO substrates were put in an etching solution containing 47:47:7 DI water/hydrochloric acid/nitric acid. The etching took about 2 minutes at 40° C. and good edge acuity was achieved. Polyimide SE1221 from Nissan Chemicals was used as the alignment layer to provide homeotropic anchoring. The polyimide was spin-coated onto the patterned ITO substrates and baked at 180° C. for an hour. The cell gap was set at 5 microns using Epostar glass spacers. The electrode patterns were registered on the mask-aligner, using fiducial marks. The top and bottom substrates were glued together using UV-epoxy. Cholesteric mixtures of Merck liquid crystal M1 106 and 0.55% w/w chiral dopant ZLI 811 were vacuum-filled into the empty cells. After the filling, the cell was sealed with UV-epoxy and annealed at 100° C. for 10 minutes. To provide a baseline for studying the midplane director orientation, some liquid crystal cells containing only the achiral mixture M1106 were also made.

Generally, four different test patterns were incorporated onto different areas of the various test cells. The cells were then examined under an Olympus BH2 polarizing microscope to examine the domain formation and dynamics. The cells were tested by applying a variety of voltages suddenly or slowly to the test cells. A number of voltage supplies were used.

EXAMPLE 1

Four simple striped patterns were made, with an angle of 30° and 45° twisting to the left, e.g., in the same direction as the pitch of the liquid crystal, between stripes on opposing substrates. For each of these angles the wires and gaps had equal widths. These widths were approximately 5 and 8 microns for each of these angles, such that the period of the entire pattern comprising both substrates was 10 microns and 16 microns along the bisector of the obtuse angle between stripes on the two substrates. These patterns showed good alignment of the direction but not of the sign of the vector D. For each pattern we define the "putative orientation" of the vector D to be the direction of the bisector of an angle between the direction of the stripes on the two substrates. There are, of course, two such angles: an acute angle and an obtuse angle. The putative orientation of the vector D is the bisector of the acute angle. A cell containing achiral nematic was illuminated in the microscope with light polarized at 45 degrees, generally and hereinafter referred to as the orientation of the polarizer, to the putative orientation of the vector D and analyzed with a polarizer oriented perpendicular to this orientation, hereinafter referred to as the orientation of the analyzer. This cell appears dark when no voltage is applied. Above the Fredrick's transition voltage the cells with the polarizers in this orientation became bright. The brightness, as expected, increased with increasing voltage, consistent with increased retardation through the cell. Under the microscope the system was seen to be bright areas containing a number of dark lines which were interpreted as 180 degree domain walls. When the vector D is non-zero and at 45 degrees, or indeed in any direction other than parallel or perpendicular, to the direction of the polarizer and analyzer it acts as a variable waveplate so that light is expected to pass through it. Thus, this result is consistent with good control of the direction but not the sign of vector D.

In order to confirm this good control the polarizer was oriented parallel to the putative direction of the vector D and the analyzer was oriented perpendicular thereto. The cell then appeared to be largely dark but containing bright lines. This result is consistent with the interpretation that the vector D is oriented along the putative orientation of D, resulting in a waveplate oriented parallel to the direction of the polarizer, except inside the bright lines or domain walls. These bright lines must then be domain walls of the first kind. A large voltage was applied to the cell and the domain pattern was allowed to coarsen until it stopped coarsening and the cell was then rotated slowly by 90 degrees so that the putative orientation of the vector D changed. During this rotation it was observed that the dark lines changed into bright lines and the bright areas changed into dark areas and back again. This confirms the interpretation of the alignment of the orientation of the vector D along the putative direction of D.

It was noted that the areas which were bright when the vector D was oriented at 45 degrees to the polarizer and analyzer shows modulation of their brightness consistent with slightly darker areas being areas where both the electrodes have gaps. This demonstrates that either the direction or the magnitude of the vector D varies somewhat in this region Similar experiments were done when the cell was filled with a chiral rather than an achiral nematic. When the vector D is non-zero, the chiral nematic both rotates and polarization of incoming light and changes the phase of one polarization relative to the other. Thus, there is no simple method using crossed polarizers and analyzers to determine the direction of the vector D unambiguously. However, when the polarizer and analyzers were at 45 degrees to the putative direction of D, the results were similar to the results for the achiral nematic. When the cell was rotated as described above similar results were obtained, except that, as expected from the optical analysis, the areas which were bright, consistent with the expected alignment of D, were less dark when the polarizer and analyzer were parallel and perpendicular to the putative alignment of D. Again this is consistent with the expected optics and proves conclusively that the simple striped pattern controls the direction but not the sign of the vector D in both achiral and chiral nematic.

EXAMPLE 2

In this example the pattern of FIG. 4a was etched on both substrates. This a repeating pattern of which several repetitions are shown in the direction which is horizontal in the figure and slightly more than a single vertical repetition is shown. Test cells containing the achiral nematic were made including both the registry of the top and bottom electrodes shown in the figure and with the registry deliberately changed by translating one electrode in the direction which is vertical in the figure by 2.5, 5.0 and 7.5 microns. This was done to test the effects of misregistered electrodes. Again the cells were examined under a microscope, with an applied voltage, with various orientations of the polarizer. After an initial transient this showed alignment of the vector D largely parallel to the direction that is horizontal in the figure. The region under the gaps which are vertical in the figure, hereinafter "putative domain wall" was, as expected, much darker than the remainder of the cell when the polarizers were at 45 degrees to the putative orientation of D. However, particularly for cells that were registered as shown in FIG. 4a, there appeared to be defects in the orientation along the putative domain wall. Moreover, when the polarizer and analyzer were parallel and perpendicular to the putative direction of the vector D the region near the putative domain wall was bright and the region which was expected to be well aligned, while dim, was brighter than expected and contained dark lines which passed through the defects on the putative domain walls. This is all consistent with good alignment of the vector D as shown in FIG. 4 but with the domain wall being a domain wall of the first kind. The defects in the domain wall are the disclination shown in FIG. 2d. The orientation in the aligned region is then not expected to be precisely the orientation shown in this figure. Rather, it is rotated by a small amount, in the direction opposite the direction the director rotates on passing through the domain wall. This accounts for this region being brighter than expected. The dark lines are then domain-wall like structures through which this direction of rotation changes sign. This implies that, for exact rotation of the director by 100 degrees through a domain wall, a wider gap is in the electrode would be required. Again, similar experiments were performed on cells containing chiral nematics. The results, as for the first experiment described, were consistent with the interpretation of the domain structure shown for the achiral nematic.

EXAMPLE 3

In this example the pattern of FIG. 5 was etched onto both substrates. This is a repeating pattern of which several repetitions in both the horizontal and vertical directions are shown. Cells were analyzed as described above demonstrating that the orientation D was as shown in FIG. 5 for appropriate registry of the electrodes. However, it was not uncommon for there to be small defects in the domain structure of the liquid crystal not associated with any apparent physical defect in the cell itself. Cells made with deliberately misregistered electrodes yielded results like those of the simple striped cells, as described above.

EXAMPLE 4

In this example the patterns of FIGS. 8a and 8b were etched into one of the substrates and the other, counter-electro was unetched, continuous ITO. Again the cell was filled with an achiral nematic and was placed in a polarizing microscope. The cell was dark until the voltage exceeded the voltage for the Fredricks transition. When the applied voltage exceeded the voltage for the Fredricks transition and after an initial transient, it was observed that, with appropriate orientation of the polarizer and analyzer approximately 45 degrees to the direction in the pattern that is horizontal in these figures, the cell was bright, with some variations in brightness consistent with the patterning of the electrode. During the initial transient there was evidence of domain walls, disclinations and other defects. Thereafter all such defects disappeared from regions of the sample free from dust, etching errors, open circuits or other defects. When the sample was rotated by 45 degrees relative to the polarizer and analyzer the cell was largely dark, again with a pattern of brightness consistent with the pattern on the electrodes. These results, particularly the lack of any evident defects in the equilibrium pattern, are consistent only with the possibility that this electrode pattern aligns both the direction and the sign of the vector D. Again the results for a chiral nematic are similar and consistent with this interpretation.

EXAMPLE 5

In this example the patterns shown in FIGS. 4b–e was etched on the two electrodes. The actual pattern used was a repeating pattern of which this figure shows only the repeating unit. The expected alignment of the vector D varies in this figure as shown, with 90 degree domain walls of the first kind expected adjacent the diagonal gaps in the electrodes, hereinafter the putative domain walls. Cells with both chiral and achiral nematics were made. The cells are again dark when the voltage is less than the Fredricks transition voltage. The cells become bright when the voltage exceeds the Fredricks transition voltage. When the polarizer and analyzer are at 45 degrees to the direction that is horizontal in this picture the cell is bright, except for the regions which are at the "top" and "bottom" of FIGS. 4b–d, which are dark, as was expected. The region of the putative domain walls are also darker. When the polarizer and analyzer are parallel and perpendicular to the direction that is horizontal in FIG. 4 all regions except the putative domain walls are dark and these are bright. After a short transient no defects in the domain structure were observed in the cell except those associated with physical defects such as open circuits, dust, etc.

Many variations and modifications of the invention will be apparent to those of ordinary skill in the art in light of the foregoing detailed disclosure. Therefore, it is to be understood that, within the scope of the appended claims, the invention can be practiced otherwise than as specifically described.

What is claimed is:

1. A liquid crystal cell comprising:
   a) first and second substrates spaced apart by a distance t and a liquid crystal material disposed therebetween;
   b) first and second electrodes disposed on said first and second substrates, respectively, and connected to a power supply, at least one of said first and second electrodes having at least one pixel defined by dimensions in a plane parallel to the plane of said substrate, said pixel further including at least one non-conducting gap therein, said at least one non-conducting gap being a small scale gap having at least one dimension in the plane of the electrode that does not exceed about 2.5 times the distance t; and,
   c) said at least one pixel, when in a field-on condition in cooperation with the other of said first or second electrode, contains an electric field effective to produce at least one liquid crystal domain having dimensions in a plane parallel to the plane of said substrates within which said liquid crystal molecules have an azimuthal orientation with predominantly the same sign and direction, and wherein at least a portion of said small scale gap is disposed within said domain at least about 1 times the distance t from the boundaries of said domain.

2. A liquid crystal cell according to claim 1 including a plurality of said small scale gaps within said at least one pixel.

3. A liquid crystal cell according to claim 1 wherein at least a portion of said small scale gap is disposed within said domain at least about 2.0 times the distance t from the boundaries of said domain.

4. A liquid crystal cell according to claim 1 wherein, when in said field-on condition, said liquid crystal material exhibits a plurality of said domains within said at least one pixel, each said domain being adjacent at least one said small scale gap.

5. A liquid crystal cell according to claim 1 wherein, when in said field-on condition, said liquid crystal material exhibits a plurality of said domains within said at least one pixel, each said domain being adjacent a plurality of said small scale gaps.

6. A liquid crystal cell according to claim 1 wherein both said first and second electrodes include at least one said pixel containing at least one said small scale gap.

7. A liquid crystal cell according to claim 1 wherein both said first and second electrodes include at least one said pixel containing a plurality of said small scale gaps.

8. A liquid crystal cell according to claim 1 wherein both said first and second electrodes include at least one said pixel wherein, when in said field-on condition, said liquid crystal material exhibits a plurality of said domains within each said pixel, each said domain being adjacent at least one said small scale gap.

9. A liquid crystal cell according to claim 1 wherein both said first and second electrodes include at least one said pixel wherein, when in said field-on condition, said liquid crystal material exhibits a plurality of said domains within each said pixel, each said domain being adjacent a plurality of said small scale gaps.

10. A liquid crystal cell according to claim 6, 7, 8 or 9 wherein said pixels on said first and second substrates are substantially adjacent and coextensive.

11. A liquid crystal cell according to claim 1 wherein at least a portion of a boundary of said domain is substantially linear, and said boundary is substantially adjacent and colinear with at least one of a non-conducting gap or portion of a non-conducting gap, or a difference in a location of edges of the electrodes on opposing substrates at an edge of said pixel, and further comprising a plurality of said small scale gaps disposed at an angle thereto.

12. A liquid crystal cell according to claim 1 wherein at least a portion of a boundary of said domain is substantially linear, and including at least one non-conducting gap or a portion of a non-conducting gap substantially adjacent and colinear with at least a portion of said linear portion of said boundary, and a plurality of said small scale gaps extending at an angle therefrom.

13. A liquid crystal cell according to claim 1 wherein at least a portion of a boundary of said domain is substantially linear, and including at least one non-conducting gap or portion of a non-conducting gap substantially adjacent and colinear with at least a portion of said linear portion of said boundary, and a plurality of said small scale gaps extending at an angle therefrom, said small scale gaps being substantially rectangular and parallel to one another.

14. A liquid crystal cell according to claim 1 wherein said domain boundaries are substantially linear, each said boundary being disposed substantially adjacent and colinear with a non-conducting gap or a portion of a non-conducting gap, and further including a plurality of said small scale gaps disposed at an angle thereto.

15. A liquid crystal cell according to claim 1 wherein said domain boundaries are composed of substantially linear segments, each said segment being substantially adjacent and colinear with at least one of a non-conducting gap or portion of a non-conducting gap, or with a difference in a location of edges of the electrodes on opposing substrates at an edge of said pixel, and further comprising a plurality of said small scale gaps disposed at an angle thereto.

16. A liquid crystal cell according to claim 1 wherein said domain boundaries are substantially linear, each said boundary being disposed substantially adjacent and colinear with a non-conducting gap or a portion of a non-conducting gap which further includes a plurality of said small scale gaps extending at an angle therefrom.

17. A liquid crystal cell according to claim 1 wherein said domain boundaries are substantially linear, each said boundary being disposed substantially adjacent and colinear with a non-conducting gap or a portion of a non-conducting gap which further includes a plurality of said small scale gaps extending at an angle therefrom, said small scale gaps being substantially rectangular.

18. A liquid crystal cell according to claim 1 wherein both said first and second substrates include at least one said pixel, said pixels being substantially adjacent and coextensive, each said pixel including a plurality of said small scale gaps, said small scale gaps being substantially rectangular and parallel to one another, and further wherein said substantially parallel gaps on opposing said substrates are rotated relative to each other by an angle of from about 10° more to about 30° less than an angle by which an azimuthal orientation of said liquid crystal rotates as a consequence of its natural pitch on passing through the cell.

19. A liquid crystal cell according to claim 1 wherein said liquid crystal material is selected from a nematic liquid crystal or a chiral nematic liquid crystal having negative dielectric anisotropy.

20. A liquid crystal cell according to claim 1 wherein at least one said substrate is treated to align the liquid crystal.

21. A liquid crystal cell according to claim 1 wherein said liquid crystal material is selected from a nematic liquid crystal or a chiral nematic liquid crystal having negative dielectric anisotropy, and wherein at least one of said substrates is treated to promote homeotropic alignment of said liquid crystal material.

22. A liquid crystal cell according to claim 1 wherein at least about 60% of the area within said at least one pixel is within about 1.5 times the distance t from an edge of a conducting portion of said electrode.

23. A liquid crystal cell according to claim 1 wherein at least about 90% of the area within said at least one pixel is within about 1.5 times the distance t from an edge of a conducting portion of said electrode.

24. A liquid crystal cell according to claim 1 wherein at least about 60% of the area within said at least one pixel is within about 0.7 times the distance t from an edge of a conducting portion of said electrode.

25. A liquid crystal cell according to claim 1 wherein both said substrates include at least one said pixel having at least about 80% of the area within said at least one pixel is within about 0.7 times the distance t from an edge of a conducting portion of said electrode.

26. A liquid crystal cell according to claim 1 wherein said small scale gaps form a pattern within each liquid crystal domain which transforms according to a two-dimensional space group selected from the group consisting of Pg, Cm or Pl.

27. A liquid crystal cell according to claim 1 wherein at least about 90% of the area within said at least one pixel is within about 0.7 times the distance t from an edge of a conducting portion of said electrode.

28. A liquid crystal cell according to claim 1 wherein, when in said field-on condition, said liquid crystal material exhibits a plurality of said domains within said at least one pixel, each said domain being adjacent a plurality of said small scale gaps, and wherein at least about 60% of the area within said at least one pixel is within about 1.5 times the distance t from an edge of a conducting portion of said electrode.

29. A liquid crystal cell according to claim 1 wherein, when in said field-on condition, said liquid crystal material exhibits a plurality of said domains within said at least one pixel, each said domain being adjacent a plurality of said small scale gaps, said small scale gaps being substantially rectangular and parallel to one another with substantially equal width and spacing, and wherein at least about 80% of the area within said at least one pixel is within about 0.7 times the distance t from an edge of a conducting portion of said electrode.

30. A liquid crystal cell comprising:
   a) first and second substrates spaced apart by a distance t and a liquid crystal material disposed therebetween;
   b) first and second electrodes disposed on said first and second substrates, respectively, and connected to a power supply, at least one of said first and second electrodes having at least one pixel defined by dimensions in a plane parallel to the plane of said substrate, said pixel further including a plurality of non-conducting gaps therein;
   c) said non-conducting gaps being small scale gaps having a length and a width in a plane of said electrode wherein said width does not exceed about 2.5 times the distance t and wherein at least about 60% of the area within said at least one pixel is within from about 1.5 times the distance t from an edge of a conducting portion of said electrode; and,
   d) said at least one pixel, when in a field-on condition in cooperation with the other of said first or second electrode, contains an electric field effective to control the direction of the liquid crystal directors of adjacent liquid crystals within said pixel.

31. A liquid crystal cell according to claim 30 wherein at least about 90% of said area within said pixel is within about 1.5 times the distance t from an edge of a conducting portion of said electrode.

32. The liquid crystal cell according to claim 30 wherein said non-conducting gaps have a length greater than said width and are generally parallel.

33. The liquid crystal cell according to claim 30 wherein said gaps are substantially rectangular and parallel to one another.

34. A liquid crystal cell according to claim 30 wherein at least about 60% of the area within said at least one pixel is within about 0.7 times the distance t from an edge of a conducting portion of said electrode.

35. A liquid crystal cell according to claim 30 wherein at least about 90% of the area within said at least one pixel is within about 0.7 times the distance t from an edge of a conducting portion of said electrode.

36. A liquid crystal cell according to claim 30 wherein both said substrates include at least one said pixel having at least about 80% of the area within said at least one pixel is within about 0.7 times the distance t from an edge of a conducting portion of said electrode.

37. A liquid crystal cell according to claim 30 wherein in a field-on condition said liquid crystal forms at least one liquid crystal domain having dimensions in a plane parallel to the plane of said substrates within which said liquid crystal molecules have an azimuthal orientation with predominantly the same sign and direction, and including at least one non-conducting gap or portion of a non-conducting gap substantially adjacent and colinear with at least a portion of a boundary of said domain, and said plurality of said small scale gaps are disposed at an angle thereto.

38. A liquid crystal cell according to claim 30 wherein in a field-on condition said liquid crystal forms at least one liquid crystal domain having dimensions in a plane parallel to the plane of said substrates within which said liquid crystal molecules have an azimuthal orientation with predominantly the same sign and direction, and including at least one non-conducting gap or portion of a non-conducting gap substantially adjacent and colinear with at least a portion of a boundary of said domain, and said plurality of said small scale gaps extend at an angle therefrom.

39. A liquid crystal cell according to claim 30 wherein in a field-on condition said liquid crystal forms at least one liquid crystal domain having dimensions in a plane parallel to the plane of said substrates within which said liquid crystal molecules have an azimuthal orientation with predominantly the same sign and direction, and including at least one non-conducting gap or portion of a non-conducting gap substantially adjacent and colinear with at least a portion of a boundary of said domain, and said plurality of said small scale gaps extend therefrom, said small scale gaps being substantially rectangular and parallel to one another.

40. A liquid crystal cell according to claim 30 wherein both said first and second substrates include at least one said pixel, said pixels being substantially adjacent and coextensive, said small scale gaps being substantially rectangular and parallel to one another, and further wherein said substantially parallel gaps on opposing said substrates are rotated relative to each other by an angle from about 10° more to about 30° less than an angle by which an azimuthal orientation of said liquid crystal rotates as a consequence of its natural pitch on passing through the cell.

41. A liquid crystal cell according to claim 30 wherein said liquid crystal material is selected from a nematic liquid crystal or a chiral nematic liquid crystal having negative dielectric anisotropy.

42. A liquid crystal cell according to claim 30 wherein at least one said substrate is treated to align the liquid crystal.

43. A liquid crystal cell according to claim 30 wherein said liquid crystal material is selected from a nematic liquid crystal or a chiral nematic liquid crystal having negative dielectric anisotropy, and wherein at least one of said substrates is treated to promote homeotropic alignment of said liquid crystal material.

* * * * *